US007779711B2

(12) United States Patent
Yoshida et al.

(10) Patent No.: US 7,779,711 B2
(45) Date of Patent: Aug. 24, 2010

(54) DRIVE FORCE TRANSMISSION DEVICE, MECHANICAL DEVICE, AND LIQUID EJECTION APPARATUS

(75) Inventors: Atsushi Yoshida, Shiojiri (JP); Taisuke Yamamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 895 days.

(21) Appl. No.: 11/652,565

(22) Filed: Jan. 12, 2007

(65) Prior Publication Data

US 2007/0169577 A1 Jul. 26, 2007

(30) Foreign Application Priority Data

Jan. 13, 2006 (JP) ............................. 2006-006050

(51) Int. Cl.
*F16H 1/26* (2006.01)

(52) U.S. Cl. ........................................ 74/89.36; 347/39

(58) Field of Classification Search ....................... None
See application file for complete search history.

(56) References Cited

U.S. PATENT DOCUMENTS 3,007,259 A * 11/1961 Abma et al. ................ 434/116
6,910,762 B2 * 6/2005 Nakamura .................. 347/85

FOREIGN PATENT DOCUMENTS

JP 2001-30507 A 2/2001

* cited by examiner

*Primary Examiner*—Stephen D Meier
*Assistant Examiner*—Alexander C Witkowski
(74) *Attorney, Agent, or Firm*—Sughrue Mion, PLLC

(57) ABSTRACT

A drive force transmission device that causes a plurality of driven members to operate in different operational areas for different operational purposes includes a lead screw and at least one movable member. The lead screw has a threaded portion formed on an outer circumferential surface of the lead screw. The lead screw is rotated about the axis of the lead screw when a drive force is generated. The at least one movable member has an engagement portion that is arranged to engage with the threaded portion of the lead screw. The movable member is moved along the axial direction of the lead screw through the engagement portion guided by the threaded portion when the lead screw rotates. While moving, the movable member associates with the driven members in a state in which the drive force is transmissible from the lead screw to the driven members and operates each of the driven members by the drive force.

14 Claims, 11 Drawing Sheets

DRIVE FORCE TRANSMISSION DEVICE, MECHANICAL DEVICE, AND LIQUID EJECTION APPARATUS

CROSS-REFERENCE TO RELATED APPLICATIONS

This application is based upon and claims the benefit of priority from prior Japanese Patent Application No. 2006-006050, filed on Jan. 13, 2006, the entire contents of which is incorporated herein by reference.

FIELD OF THE INVENTION

The present invention relates to a drive force transmission device, a mechanical device, and a liquid ejection apparatus.

BACKGROUND

Generally, an inkjet printer is known as a liquid ejection apparatus that ejects liquid, or ink, onto a target through a nozzle opening defined in a nozzle-forming surface of a recording head. In the inkjet printer, after having been ejected through the nozzle opening of the recording head, the ink may remain in the vicinity of the nozzle opening or be splashed back by a targeted recording medium such as a sheet of paper, adhering to the nozzle-forming surface.

If the ink adheres to the nozzle-forming surface, ejection of the ink from the nozzle opening may occur in an offset direction or the ink may clog the nozzle opening, which leads to a printing problem. To solve this problem, as described in Japanese Laid-Open Patent Publication No. 2001-30507, the inkjet printer typically includes, for example, a flushing box and wipers. The flushing box receives the ink that is forcibly ejected from a nozzle opening of a recording head in a non-printing state. Each of the wipers wipes the ink off from the nozzle-forming surface to clean the nozzle-forming surface. The flushing box and the wipers are driven members that operate in different operational areas for different operational purposes when powered by drive force transmitted from a drive source.

More specifically, the printer of Japanese Laid-Open Patent Publication No. 2001-30507 has a rotary drum and an arm member. Each of the rotary drums is located below the nozzle-forming surface of the recording head and rotates about a horizontal axis. The arm member is supported by a shaft of the corresponding rotary drum and caused to be moved by rotation of the rotary drum. The flushing box and the associated wiping members are held by the distal end of the corresponding arm member. The rotary drum forms a drive force transmission member and the arm member forms a movable member. Through movement of the arm member caused by rotation of the rotary drum, the flushing box is moved between a liquid receiving position and a liquid non-receiving position, or a retreat position, which is spaced from the liquid receiving position. When the flushing box is located at the liquid receiving position, the flushing box is opposed to the nozzle-forming surface.

The wiping members are formed as follows. A plurality of lead screws, which extend parallel with the shaft of the rotary drum, are provided on the distal end of the arm member at position distal from the flushing box. A wiper holder, or a wiper carrier, which supports the wiper, is mounted on each of the lead screws. The wiper holder is movable in the axial direction of the lead screw. The lead screws each form a drive force transmission member. Each wiper holder forms a movable member and each wiper forms a wiping member. Each of the wipers is moved to a position immediately below the nozzle-forming surface of the recording head by causing the arm member to move through rotation of the associated rotary drum. Then, drive force is generated to rotate the lead screw. This moves the wiper between a wiping position for wiping the nozzle-forming surface and a non-wiping position spaced from the wiping position while flexibly deforming through slidable contact with the nozzle-forming surface.

The printer of Japanese Laid-Open Patent Publication No. 2001-30507 needs a plurality of drive force transmission members (i.e., the rotary drum and lead screws) and a plurality of movable members (i.e., the arm member and wiper holders) for a plurality of driven members (i.e., the flushing box and the wipers). In other words, a specific drive force transmission device comprising a drive force transmission member and a movable member must be provided for each of the driven members, which operate in different operational areas for different operational purposes.

Further, a single-row wiper that wipes a nozzle row for black ink exclusively and multiple-row wipers that wipe nozzle rows for color ink are supported by a specific wiper holder, respectively. Each of the wiper holders is mounted in a specific one of the lead screws. Accordingly, also in this regard, the printer of Japanese Laid-Open Patent Publication No. 2001-30507 must include specific drive force transmission devices for different driven members that operate in different operational areas for different operational purposes.

Also, in addition to the flushing box and the wipers, a printer normally include other driven members such as a cap member, which is selectively raised and lowered for sealing or releasing the nozzle-forming surface of the recording head, or different types of valves. It is thus necessary to provide additional drive force transmission devices specifically for these driven members. Such necessity of specific drive force transmission devices enlarges the printer as a whole and complicates the configuration of the printer.

SUMMARY

Accordingly, it is an objective of the present invention to provide a drive force transmission device, a mechanical device, and a liquid ejection apparatus including a small-sized and simply-configured drive force transmission structure that transmits drive force to a plurality of driven members operating in different operational areas for different operational purposes.

According to an aspect of the invention, a drive force transmission device that causes a plurality of driven members to operate in different operational areas for different operational purposes is provided. The drive force transmission device includes a lead screw and at least one movable member. The drive force transmission device causes a plurality of driven members to operate in different operational areas for different operational purposes. The lead screw has a threaded portion formed on an outer circumferential surface of the lead screw. The lead screw is rotated about the axis of the lead screw when a drive force is generated. The at least one movable member has an engagement portion that is arranged to engage with the threaded portion of the lead screw. The movable member is moved along the axial direction of the lead screw through the engagement portion guided by the threaded portion when the lead screw rotates. While moving, the movable member associates with the driven members in a state in which the drive force is transmissible from the lead screw to the driven members and operates each of the driven members by the drive force.

According to another aspect of the invention, a mechanical device including a plurality of driven members, a lead screw, and at least one movable member is provided. The plurality of driven members operates in different operational areas for different operational purposes. The lead screw has a threaded portion formed on an outer circumferential surface of the lead screw. The lead screw is rotated about the axis of the lead screw when a drive force is generated. The at least one movable member has an engagement portion that is arranged to engage with the threaded portion of the lead screw. The movable member is moved along the axial direction of the lead screw through the engagement portion guided by the threaded portion when the lead screw rotates. While moving, the movable member associates with the driven members in a state in which the drive force is transmissible from the lead screw to the driven members and operates each of the driven members by the drive force.

According to yet another aspect of the invention, a liquid ejection including a plurality of driven members, a drive force transmitting member, and at least one movable member is provided. The plurality of driven members include at least two members selected from a cap member, a wiping member, a valve member, and a liquid receiving member. The cap member is movable between a sealing position at which the cap member is allowed to seal a nozzle-forming surface of a liquid ejection head and a non-sealing position spaced from the nozzle-forming surface. The wiping member is movable between a wiping position at which the wiping member is allowed to wipe off an adhered liquid from the nozzle-forming surface of the liquid ejection head and a non-wiping position spaced from the wiping position. The valve member is movable between an opening position at which the interior of a liquid passage in which the liquid flows in a pressurized state is exposed to the air and a closing position at which the interior of the liquid passage is blocked from the air. The liquid receiving member is movable between a receiving position at which the liquid receiving member is opposed to the nozzle-forming surface in such a manner as to receive the liquid ejected from the liquid ejection head when printing is not performed and a non-receiving position spaced from the receiving position. The drive force transmitting member operates at a certain position when a drive force is generated. The at least one movable member moves in a predetermined direction when the drive force transmitting member operates. While moving, the movable member associates with at least two of the driven members in a state in which the drive force is transmissible from the drive force transmitting member to the driven members and operates each of the driven members by the drive force.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EXEMPLARY EMBODIMENTS

An inkjet printer according to an embodiment of a drive force transmission device, a mechanical device, and a liquid ejection apparatus of the present invention will now be described with reference to the attached drawings.

In the description, the directions “upward”, “downward”, “right”, and “left” will refer to the directions indicated by the corresponding arrows of the drawings.

Figure 1:
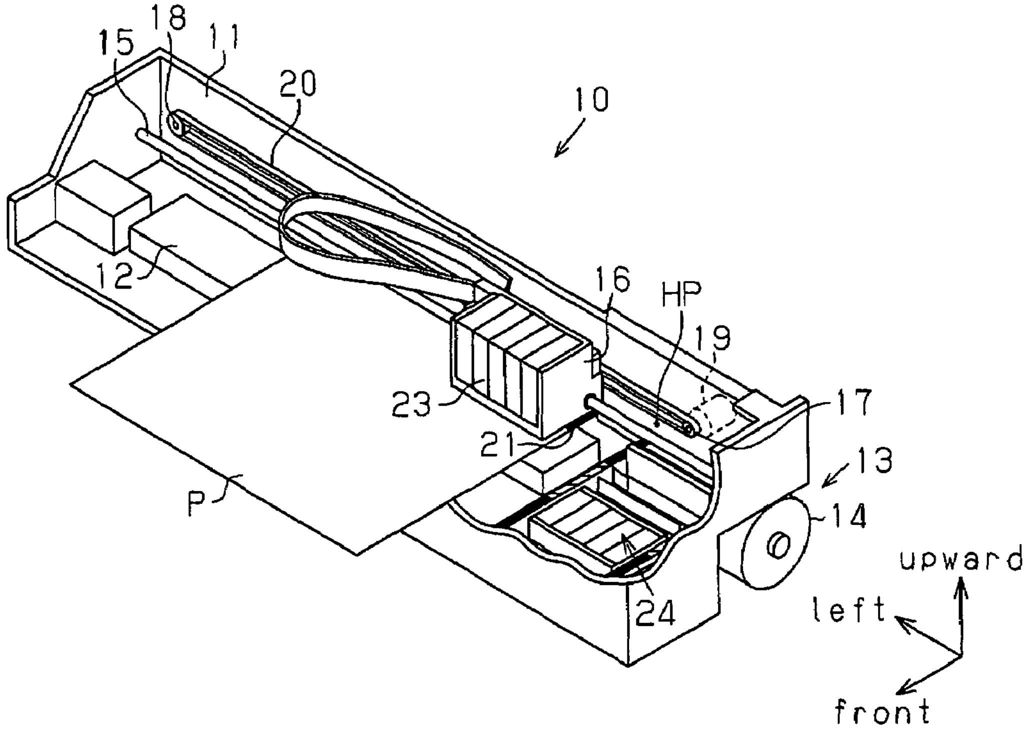
FIG. 1 is a perspective view showing a printer according to an embodiment of the present invention.

As shown in FIG. 1, a printer 10, or a liquid ejection apparatus or a mechanical device of the illustrated embodiment, includes a box-like body casing 11. A platen 12 is arranged in a lower portion of the space in the body casing 11 and extends in the longitudinal direction of the body casing 11, or a main scanning direction (a left-and-right direction of FIG. 1). A waste ink tank (not shown) is provided below the platen 12. The platen 12 is a support table that supports a sheet of paper P, which is a target. The platen 12 is driven by the drive force of a paper sending motor 14 of a paper sending mechanism 13 and thus moves the paper sheet P in a sub-scanning direction (a front-and-back direction of FIG. 1) perpendicular to the main scanning direction.

A guide shaft 15 is provided above the platen 12 in the body casing 11 and passes through a carriage 16, thus movably supporting the carriage 16. A drive pulley 17 and a driven pulley 18 are rotatably supported at the positions corresponding to the opposing ends of the guide shaft 15 on a rear surface of the body casing 11. A carriage motor 19 or a drive source that reciprocates the carriage 16 is connected to the drive pulley 17. A timing belt 20 is wound around the two pulleys 17, 18 to fix the carriage 16. This arrangement allows the carriage 16 to move in the main scanning direction through the timing belt 20 while driven by the carriage motor 19 and guided by the guide shaft 15.

Figure 2:
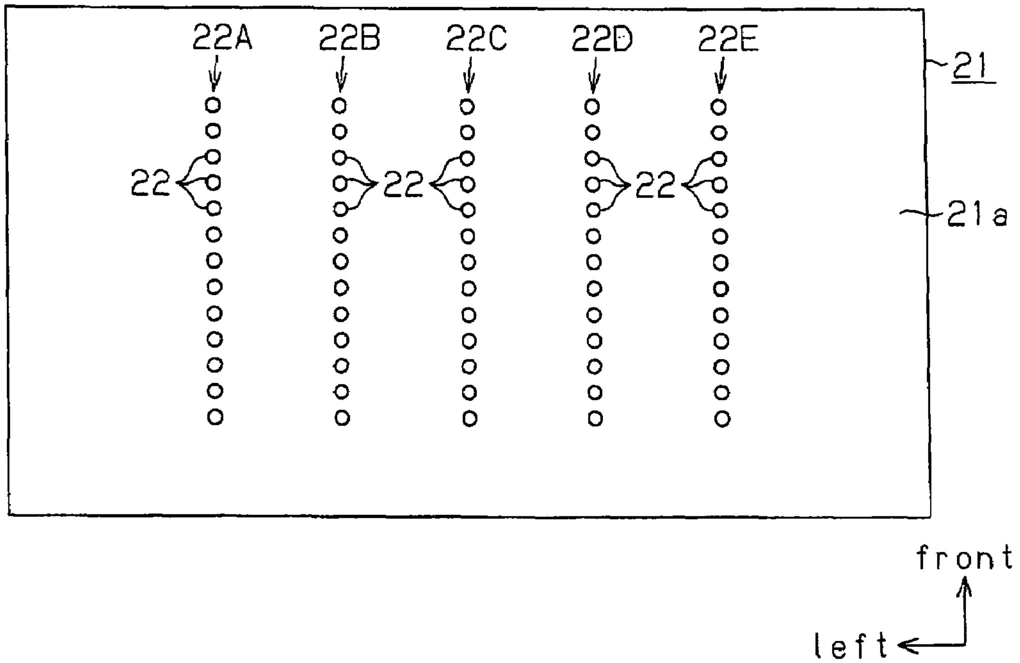
FIG. 2 is a bottom view showing a recording head.

Referring to FIG. 1, a recording head 21, or a liquid ejection head, is provided below the carriage 16. As illustrated in FIG. 2, a plurality of nozzle openings 22 are defined in a lower surface, or a nozzle-forming surface 21*a*, of the recording head 21. The nozzle openings 22 define a plurality of (in FIG. 2, five) nozzle rows 22A, 22B, 22C, 22D, and 22E that are spaced at constant intervals in the left-and-right direction and extend in the front-and-back direction. In the illustrated embodiment, the nozzle row 22E located rightmost in FIG. 2 is defined by the nozzle openings 22 through which black ink is ejected for monochrome printing. The nozzle rows 22A to 22D are each defined by the nozzle openings 22 through which color ink is ejected for color printing.

With reference to FIG. 1, a plurality of (in the illustrated embodiment, five) ink cartridges 23 are removably mounted on the carriage 16. Each of the ink cartridges 23 corresponds to one of the nozzle rows 22A to 22E, which are defined on the nozzle-forming surface 21*a* of the recording head 21. Each ink cartridge 23 supplies ink to the nozzle openings 22 of the associated nozzle rows 22A to 22E through an ink passage (not shown) defined in the recording head 21. In the illustrated embodiment, the ink cartridge 23 located rightmost in FIG. 1 retains the black ink for the monochrome printing and the other ink cartridges 23 each retain a corresponding color ink for the color printing.

A home position HP is defined in a portion (a right portion of FIG. 1) of the space in the body casing 11, or a non-printing area outside the movement range of the paper sheet P. The home position HP is the space in which the carriage 16 stands by when the printer 10 is turned off or maintenance is performed on the nozzle-forming surface 21*a* of the recording head 21. A maintenance unit 24 is provided below the home position HP and carries out various maintenance operations for maintaining effective ink ejection from the recording head 21 to the paper sheet P.

The configuration of the maintenance unit 24 will hereafter be explained in detail with reference to FIGS. 3 to 14.

Figure 3:
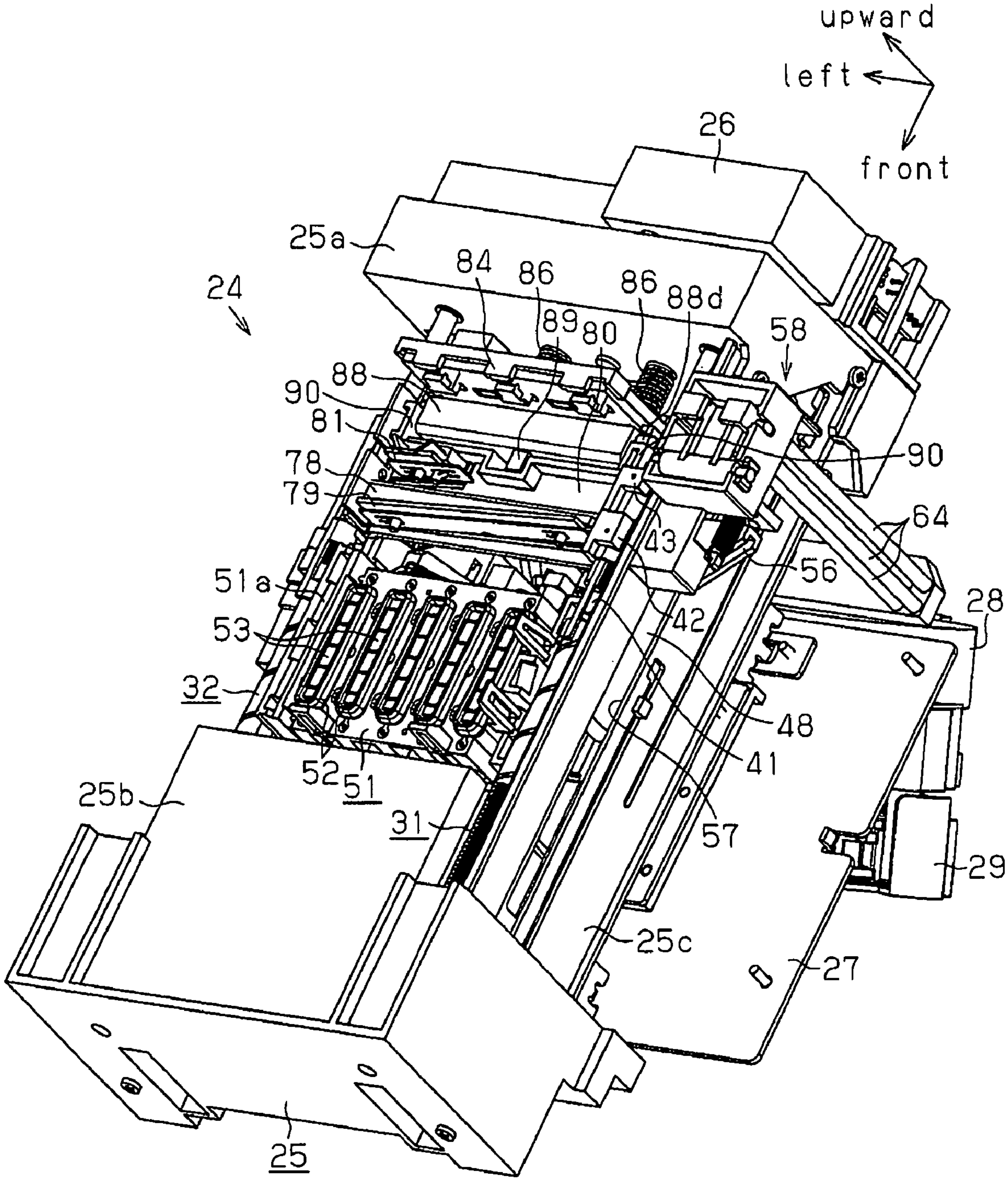
FIG. 3 is a perspective view showing a maintenance unit as viewed from the front right side.
Figure 4:
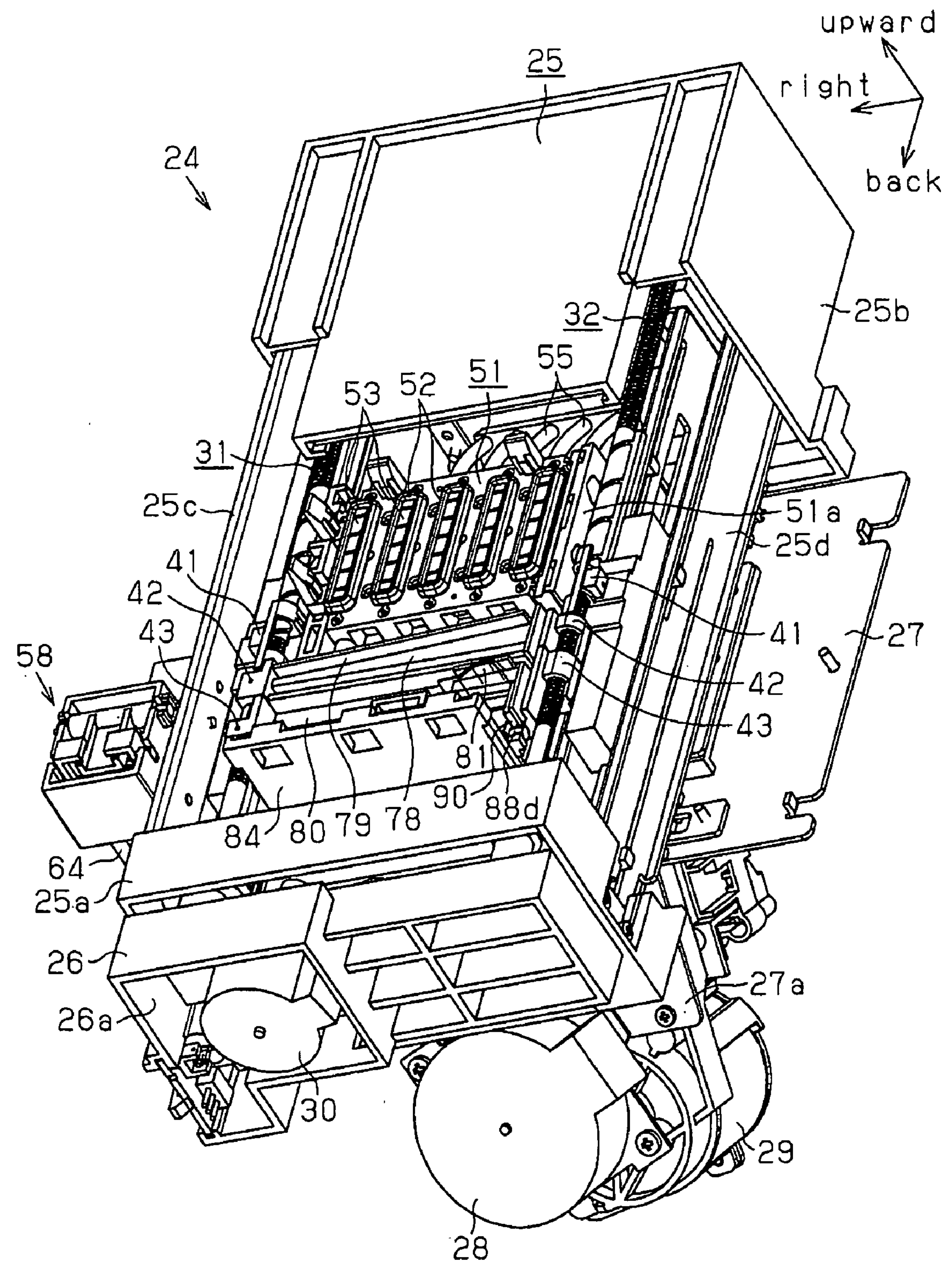
FIG. 4 is a perspective view showing the maintenance unit as viewed from the rear left side.
Figure 5:
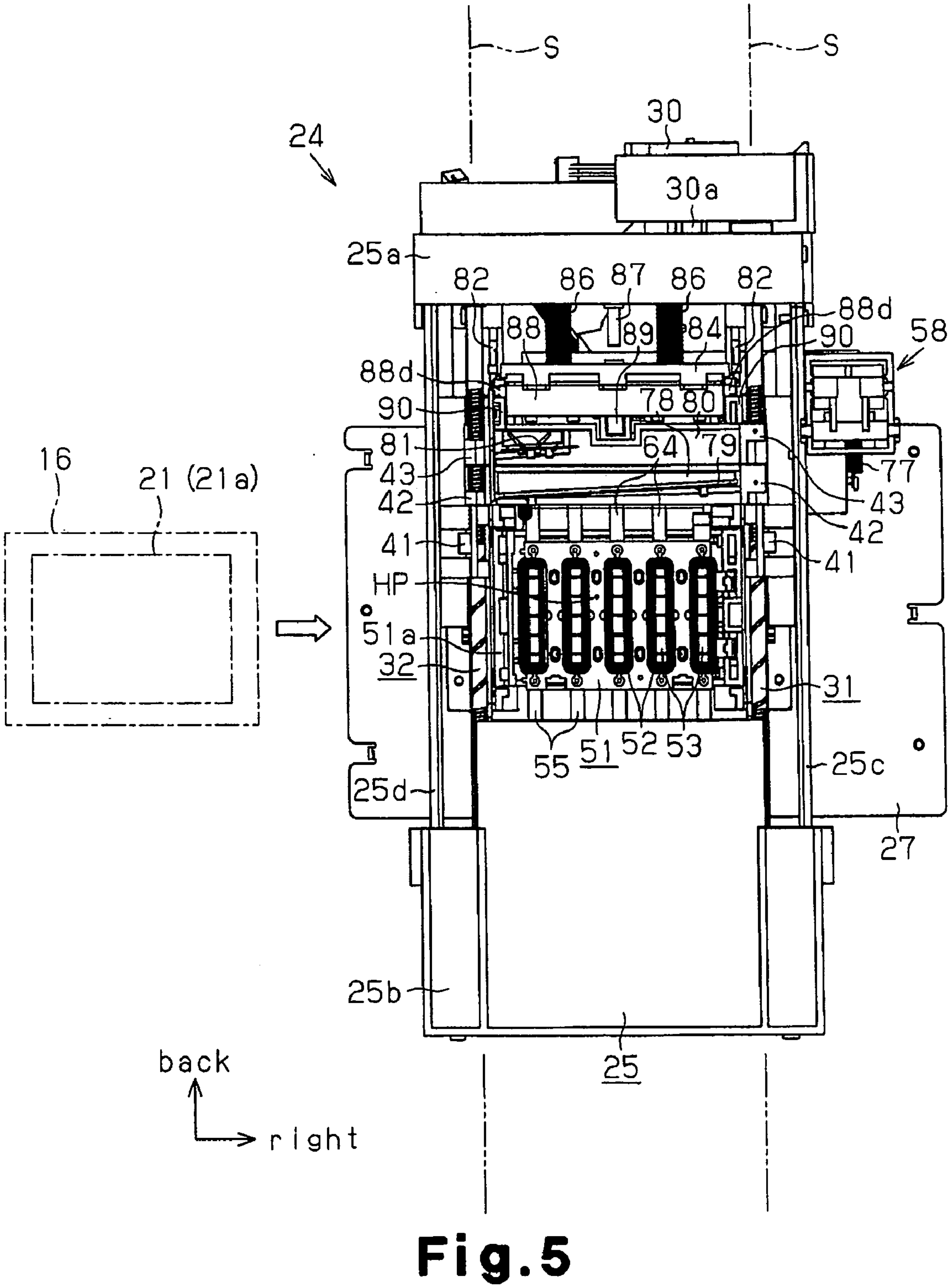
FIG. 5 is a plan view showing the maintenance unit.

With reference to FIGS. 3 to 5, the maintenance unit 24 has a body 25 shaped as a substantially rectangular frame. The body 25 includes a rear casing 25*a*, a front casing 25*b*, a right frame member 25*c*, and a left frame member 25*d*. The rear casing 25*a* has a substantially box-like shape and has a rear opening. The front casing 25*b* has also a box-like shape but larger-sized and has a rear opening. The front-and-back dimension of the front casing 25*b* is greater than that of the rear casing 25*a*. The right frame member 25*c* connects the casings 25*a*, 25*b* to each other at their respective right ends. The left frame member 25*d* connects the casings 25*a*, 25*b* to each other at their respective left ends. A sub casing 26 is secured to the rear side of the rear casing 25*a* in such a manner as to close the rear opening of the rear casing 25*a*. Referring to FIG. 4, the right half of the space in the sub casing 26 defines a motor receiving recess 26*a* (see FIG. 4).

Figure 6:
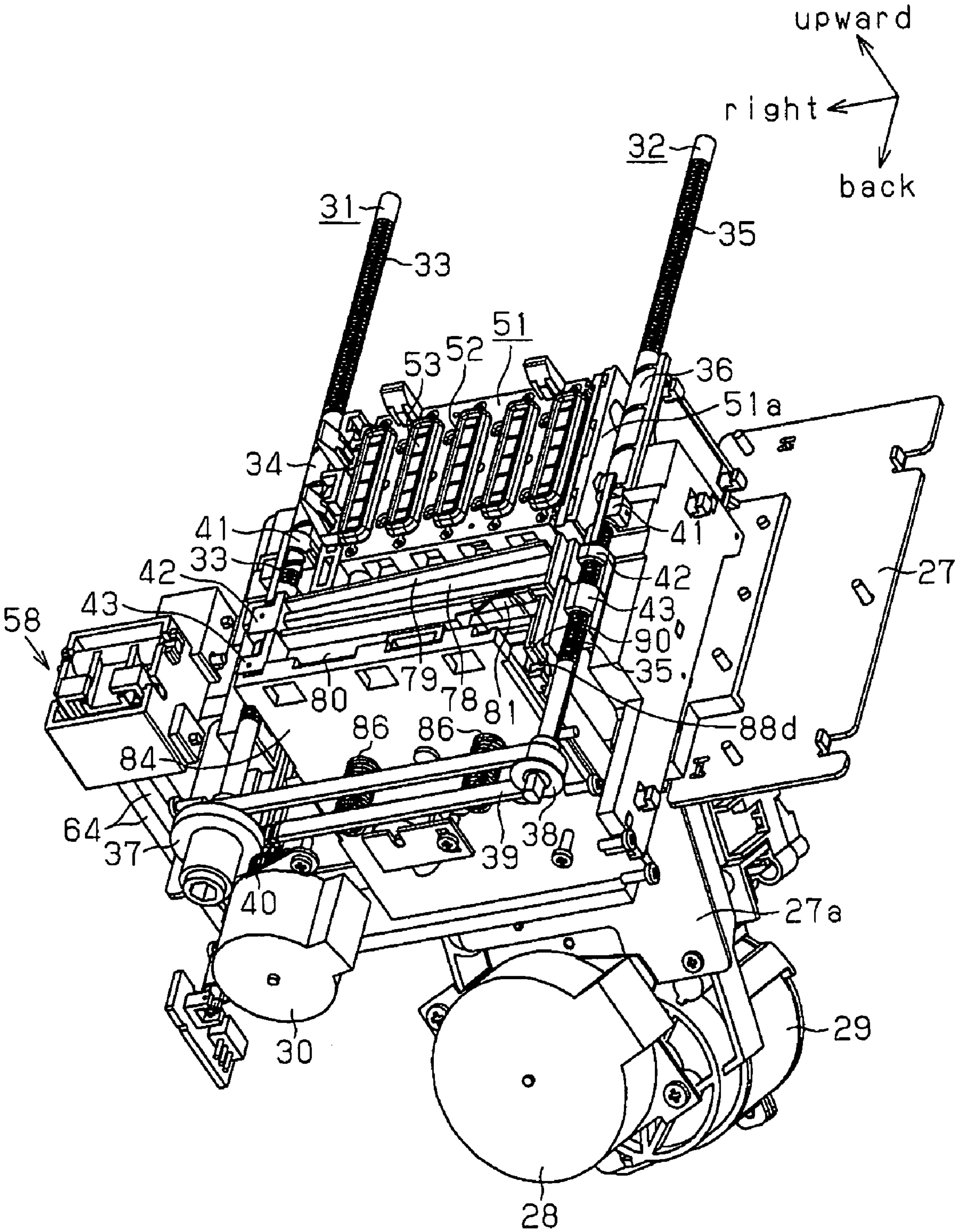
FIG. 6 is a perspective view showing the configuration of the interior of the body of the maintenance unit.

Referring to FIGS. 3 to 5, an attachment plate 27 is arranged below the body 25 and fixed in a horizontal state. The left-and-right dimension of the attachment plate 27 is greater than the dimension of the body 25. With reference to FIGS. 4 and 6, a suction pump 29 formed by a pump motor 28 and a tube pump is supported by the attachment plate 27 through an attachment bracket 27*a* in an inclined state. The attachment plate 27 is supported by the body casing 11 through a securing member (not shown). In this manner, as illustrated in FIG. 1, the maintenance unit 24 is held in a fixed state at a position below the home position HP in the body casing 11.

As shown in FIGS. 4 and 5, a drive motor 30 is secured to a wall of the motor receiving recess 26*a* of the sub casing 26. The drive motor 30 serves as a drive source and is selectively rotatable in a forward direction and a reverse direction. Referring to FIG. 5, an output shaft 30*a* of the drive motor 30 extends through the sub casing 26 and projects forward. The distal end of the output shaft 30*a* is arranged in the rear casing 25*a*.

Figure 7:
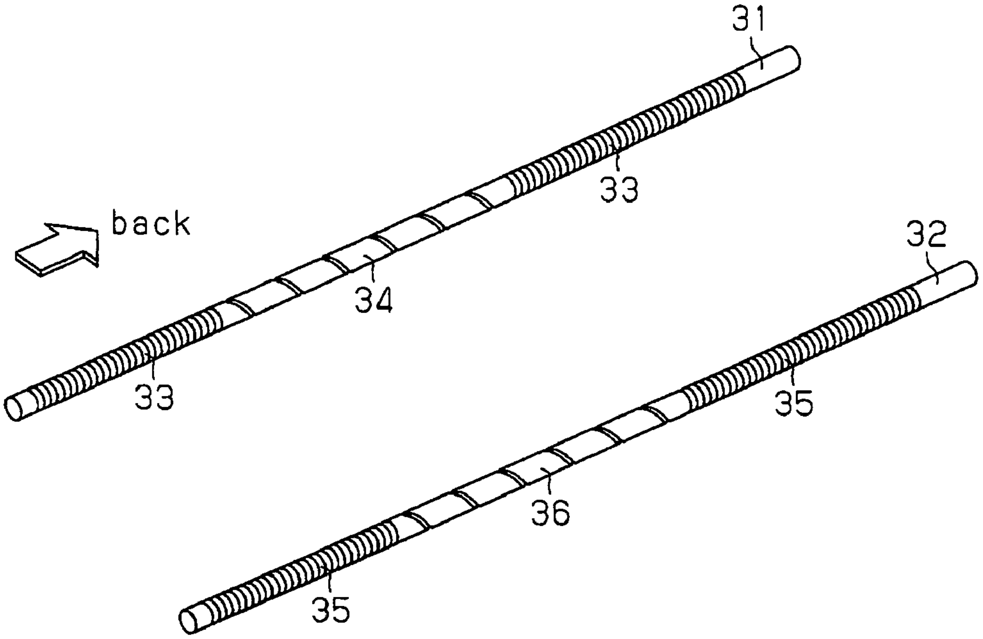
FIG. 7 is a perspective view showing lead screws.

As shown in FIGS. 3 to 5, a right lead screw 31 and a left lead screw 32 are rotatably provided between the rear casing 25*a* and the front casing 25*b* of the body 25. The right lead screw 31 is located above and inward from the right frame member 25*c*, extending horizontally along the front-and-back direction. The left lead screw 32 is located above and inward from the left frame member 25*d*, extending horizontally along the front-and-back direction. The right and left lead screws 31, 32 each form a drive force transmission member and a sending member. Referring to FIG. 7, the right lead screw 31 has first threaded sending portions 33 formed on the outer circumferential surfaces of the longitudinal front and rear end portions of the lead screw 31. The right lead screw 31 also has a second threaded sending portion 34 formed on the outer circumferential surface of a substantial longitudinal middle portion of the lead screw 31. Similarly, the left lead screw 32 has first threaded sending portions 35 formed on the outer circumferential surfaces of the longitudinal front and rear end portions of the lead screw 32 and a second threaded sending portion 36 formed on the outer circumferential surface of a substantial longitudinal middle portion of the lead screw 32. The pitch of each of the first threaded sending portions 33, 35 is smaller than the pitch of each of the second threaded sending portions 34, 36. The rear end of the right lead screw 31 and the rear end of the left lead screw 32 are received in the rear casing 25*a*.

FIG. 6 shows the maintenance unit 24 of FIG. 4 without the body 25 and the sub casing 26. Synchronous pulleys 37 and a synchronous pulley 38 are secured to the rear end of the lead screw 31 and the rear end of the lead screw 32, respectively. An endless pinion belt 39 is wound around the pulleys 37, 38. The pulley 37, which is secured to the rear end of the right lead screw 31, is connected to the distal end of the output shaft 30*a* of the drive motor 30 through a transmission gear 40 in such a manner as to allow transmission of the drive force. Therefore, when the drive motor 30 runs and generates the drive force, the right and left lead screws 31, 32 synchronously rotate in the same directions about the corresponding axes S (see FIG. 5).

Figure 8:
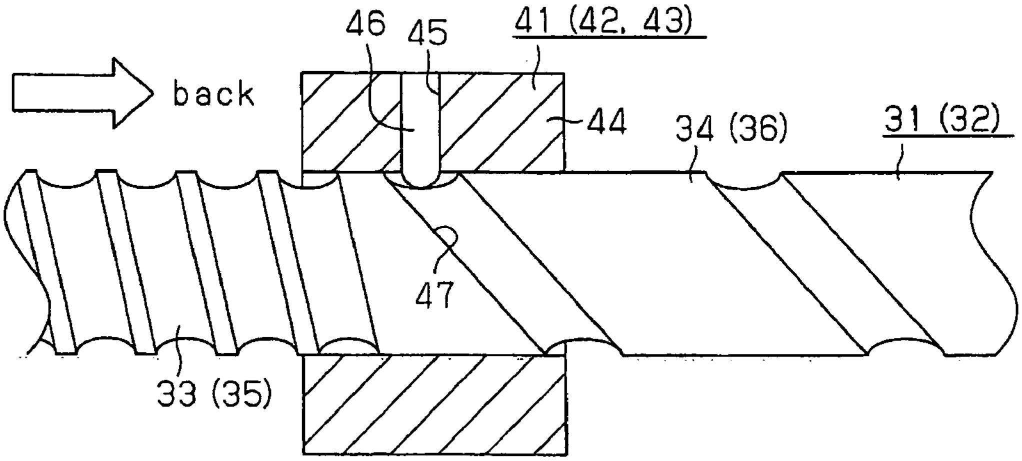
FIG. 8 is a cross-sectional view showing the lead screw and a cylindrical portion of a movable member in a mutually engaged state.

With reference to FIGS. 3 to 6, a plurality of movable members 41, 42 and 43 are provided around each of the right and left lead screws 31, 32 along the direction of the axes S. In the illustrated embodiment, a total of six movable members, which are two movable members 41, two movable members 42, and two movable members 43, in pairs, are employed. In other words, each of the movable members 41, the associated one of the movable members 42, and the associated one of the movable members 43 are arranged around the common one of the lead screws 31, 32. With reference to FIG. 8, each of the movable members 41, 42 and 43 has a cylindrical portion 44 at which the movable member 41, 42 and 43 is engaged with the corresponding lead screws 31, 32. A bore 45 radially extends through a portion of the cylindrical portion 44. A pin 46, as an engagement portion, is fitted in each of the bores 45.

The distal end of the pin 46 of each cylindrical portion 44 is engaged with a spiral threaded groove 47, which is provided continuously from the first threaded sending portions 33, 35 to the second threaded sending portion 34, 36 of the associated lead screws 31, 32. The pins 46 are guided by the threaded groove 47 when the lead screws 31, 32 rotate. Thus, each pair of the movable members 41, 42 and 43 move sequentially along the same directions of the axes S of the lead screws 31, 32.

In the illustrated embodiment, when the drive motor 30 runs in the forward direction, each of the lead screws 31, 32 rotates in a forward direction in such a manner that the movable members 41 to 43 then proceed from the rear casing 25*a* toward the front casing 25*b*. Contrastingly, when the drive motor 30 rotates in the reverse direction, each lead screw 31, 32 rotates in a reverse direction in such a manner that the movable members 41 to 43 retreat from the front casing 25*b* toward the rear casing 25*a*. In the illustrated embodiment, the lead screws 31, 32 and the movable members 41 to 43 form a drive force transmission device.

The movable members 41, which are located foremost of the movable members 41 to 43 in the directions of the axes S of the lead screws 31, 32, are provided for moving a cap member and a valve member, which will be explained later. The movable members 41 transmit the drive force produced through rotation of the lead screws 31, 32 to the cap member and the valve member. The movable members 42, which are located the second foremost in the directions of the axes S of the lead screws 31, 32, are employed for moving a wiping member, which will be explained later. The movable members 42 transmit the drive force generated through rotation of the lead screws 31, 32 to the wiping member. The movable members 43, which are located rearmost in the directions of the axes S of the lead screws 31, 32, are provided form moving the wiping member and a liquid receiving member, which will be explained later. The movable members 43 transmit the drive force generated through rotation of the lead screws 31, 32 to the wiping member and the liquid receiving member.

First, the movable members 41, which move the cap member and the valve member, will be explained.

As shown in FIGS. 9A to 11B, a substantially rectangular plate 48, which extends in the front-and-back direction, is formed integrally with each of the movable members 41. Each of the plates 48 extends downward from the associated one of the movable members 41 at a position inward from the corresponding one of the right and left frame members 25*c*, 25*d*. An elongated guide bore 49 is defined in each plate 48 and serves as an associating portion through which the associated movable member 41 associates with the cap member. With reference to FIGS. 9A to 11B, each of the guide bores 49 has a rear horizontal portion 49*a*, a diagonal portion 49*b*, and a front horizontal portion 49*c*. The rear horizontal portion 49*a* extends horizontally from a lower portion at the rear end to a substantial middle portion of the plate 48 in the fore-and-back direction of the plate 48. The diagonal portion 49*b* extends diagonally from the front end of the rear horizontal portion 49*a* toward the vicinity of an upper portion at the front end of the plate 48. The front horizontal portion 49*c* extends horizontally from the front end of the diagonal portion 49*b* to the upper portion at the front end of the plate 48.

Referring to FIGS. 9A to 11B, a holder member 50, which is shaped like a rectangular frame and has an upper opening, is provided inward from the plates 48 and at the positions corresponding to the second threaded sending portions 34, 36 of the lead screws 31, 32. A cap member 51 is received in the holder member 50 in a state accommodated in a cap holder 51*a* shaped like a box having a closed bottom. In this state, the cap member 51 is movable in the up-and-down direction together with the cap holder 51*a*. A coil spring (not shown) is arranged between a lower surface of the cap member 51 and an inner bottom surface of the cap holder 51*a* in such a manner as to urge the cap member 51 upward. In FIGS. 9A to 11B, the maintenance unit 24 is schematically illustrated as viewed from the left side. Therefore, only the left lead screw 32 and the associated threaded sending portions 35, 36 are shown in the drawings.

The cap member 51, which forms the cap member, will hereafter be explained.

With reference to FIGS. 3 to 6 and 9 to 11, the cap member 51 has a substantially rectangular box shape. A plurality of (in the illustrated embodiment, five) rectangular seal portions 52 are formed on an upper surface of the cap member 51. Each of the seal portions 52 corresponds to one of the nozzle rows 22A to 22E, which are defined on the nozzle-forming surface 21*a* of the recording head 21. A cap small chamber (not shown) is defined in each of the seal portions 52 and receives an ink absorbing member 53. The ink absorbing members 53 absorb and retain the ink ejected from the nozzle openings 22 of the corresponding nozzle rows 22A to 22E.

With reference to FIGS. 9A-C and 10, a projection 54 projects horizontally and outwardly from each of the left and right walls of the cap holders 51*a*. Each of the projections 54 is engaged with the guide bore 49 of the corresponding plate 48, which is formed integrally with the associated movable member 41. When the movable members 41 (and the plates 48) are moved in the front-and-back direction through rotation of the lead screws 31, 32, the projections 54 projecting from the cap holder 51*a* slide in the guide bores 49 of the plates 48. Particularly, the projections 54 move in the up-and-down direction when sliding along the diagonal portions 49*b* of the guide bores 49.

That is, the cap member 51 is located at a sealing position, or an uppermost position, when the projections 54 of the cap holder 51*a* are engaged with the front horizontal portions 49*c* of the guide bore 49 of the plates 48. In this state, the nozzle-forming surface 21*a* of the recording head 21 can be sealed through tight contact with the seal portions 52. Contrastingly, the cap member 51 is located at a non-sealing position, or a lowermost position spaced from the nozzle-forming surface 21*a* of the recording head 21, when the projections 54 of the cap holder 51*a* are engaged with the rear horizontal portions 49*a* of the guide bore 49 of the plates 48.

When the lead screws 31, 32 rotate and the movable members 41 move along the second threaded sending portions 34, 36, the projections 54 of the cap holder 51*a* are slidably guided by the diagonal portions 49*b* of the guide bores 49 of the plates 48, which move integrally with the movable members 41. This selectively raises and lowers the cap member 51 between the sealing position and the non-sealing position in association with the movement of the movable members 41.

As shown in FIGS. 4 and 5, ink drainage tubes 55, or liquid passages, extend from the front wall of the cap member 51. Each of the ink drainage tubes 55 corresponds to one of the cap small chambers in which the ink absorbing members 53 are received. Each ink drainage tube 55 is routed into the suction pump 29 that is supported by the attachment plate 27 at a position below the body 25. When the cap member 51 is located at the sealing position and the suction pump 29 is activated, the waste ink is drawn from the cap small chambers through the corresponding ink drainage tubes 55 and discharged into the waste ink tank (not shown) that is arranged in a lower portion of the space in the body casing 11.

With reference to FIGS. 3, 12, and 13, a pressing piece 56, which has a substantially triangular shape as viewed from above, projects horizontally from an outer side surface of the plate 48 that is located inward from the right frame member 25*c* of the body 25. The pressing piece 56 serves as an associating portion through which the movable member 41 associates with the valve member. The pressing piece 56 extends through a cutout groove 57, which is defined in the right frame member 25_c_ and extends in the front-and-back direction, and projects to the exterior of the body 25. When the lead screws 31, 32 rotate and the movable members 41 and then the plates 48 move in the front-and-back direction, the pressing piece 56 moves in the front-and-back direction together with the movable members 41 and the plates 48 to operate an air exposure valve device 58 including a valve member.

Hereinafter, the air exposure valve device 58 including the valve member will be explained.

As particularly shown in FIG. 3, the air exposure valve device 58 is arranged outside the rear end of the right frame member 25_c_ of the body 25. The air exposure valve device 58 is located on the movement path of the pressing piece 56 projecting from the associated movable member 41, which has been described above. As shown in FIGS. 12A, 12B, 13A, and 13B, the air exposure valve device 58 has a rectangular box-like casing portion 59 fixed to the right frame member 25_c_ of the body 25. A rectangular opening 61 is defined in a bottom wall 60 of the casing portion 59 to be sized to extend substantially a front half of the bottom wall 60.

Figure 13A:
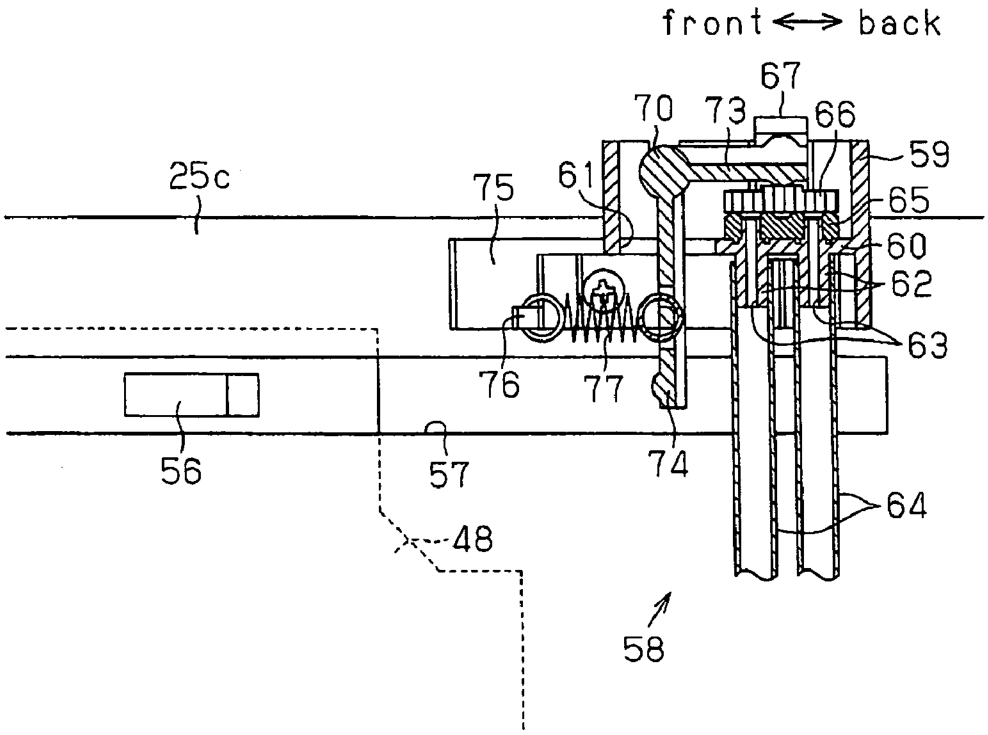
FIG. 13A is a cross-sectional view taken along line 13-13A of FIG. 12A.
Figure 13B:
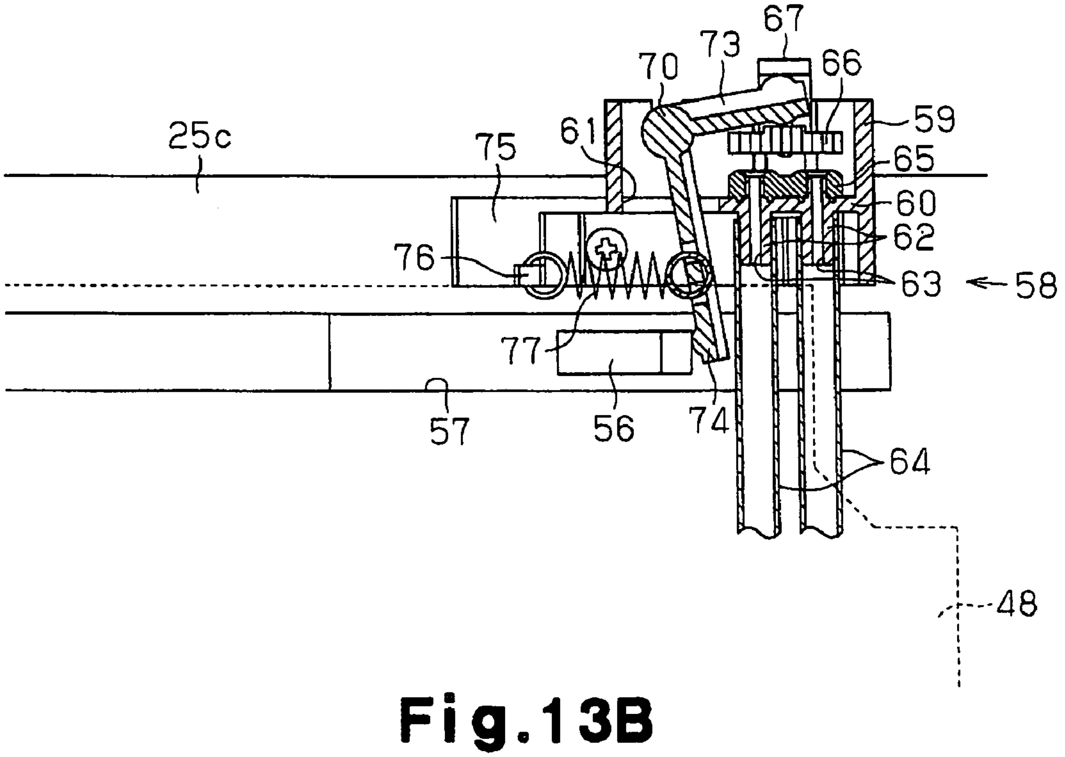
FIG. 13B is a cross-sectional view showing a state in which the pressing valve is retracted from the state of FIG. 13A.

Referring to FIGS. 13A and 13B, a plurality of (in the illustrated embodiment, five) cylindrical portions 62 are provided on the bottom wall 60 of the casing portion 59. One of the opposing ends of each of the cylindrical portions 62 projects upward and the other projects downward. Each cylindrical portion 62 defines a atmospheric or air exposure hole 63. The upper end of an air tube 64 is connected to the lower end of each cylindrical portion 62, which extends downward from a lower surface of the bottom wall 60. With reference to FIG. 5, the lower end of each air tube 64 is routed into the rear wall of the cap member 51 and communicates with the corresponding cap small chamber.

Figure 12A:
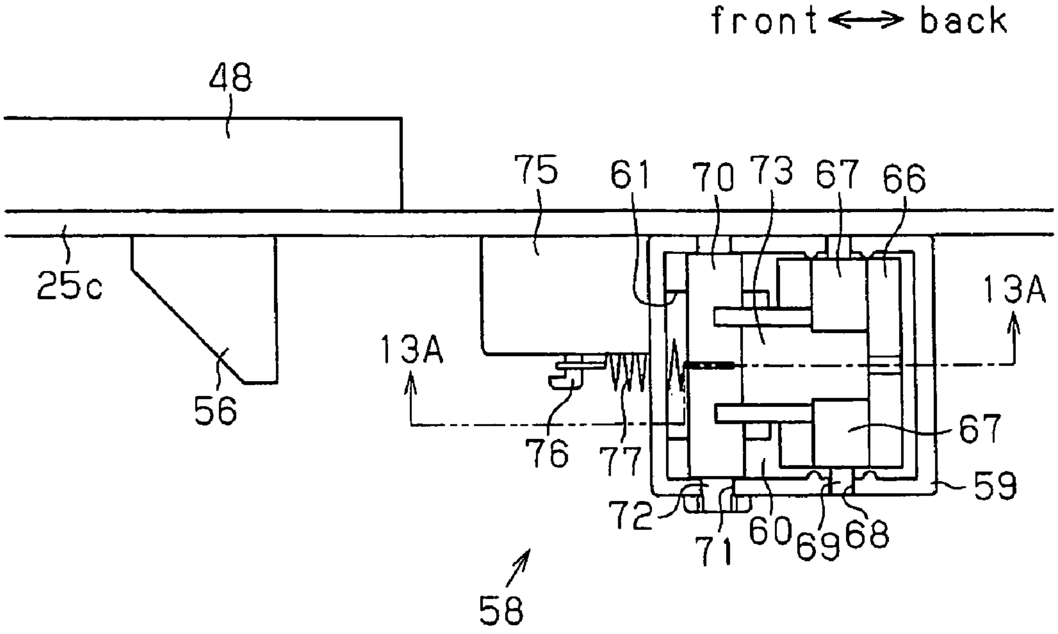
FIG. 12A is a plan view showing the relative positions of an air exposure valve device and a pressing valve.

A valve seat 65 formed of elastic material such as rubber is secured to the upper end of each cylindrical portion 62 that projects from an upper surface of the bottom wall 60 in such a manner as to ensure communication between the air exposure hole 63 and the air. As shown in FIGS. 12A, 13A, and 13B, a rectangular plate-like valve body 66, or a valve member, is mounted on each of the valve seats 65. A pair of hook-like engagement pieces 67 are provided on an upper surface of each valve body 66 and at opposing sides of the valve body 66, as opposed to each other in a symmetrical manner.

Figure 12B:
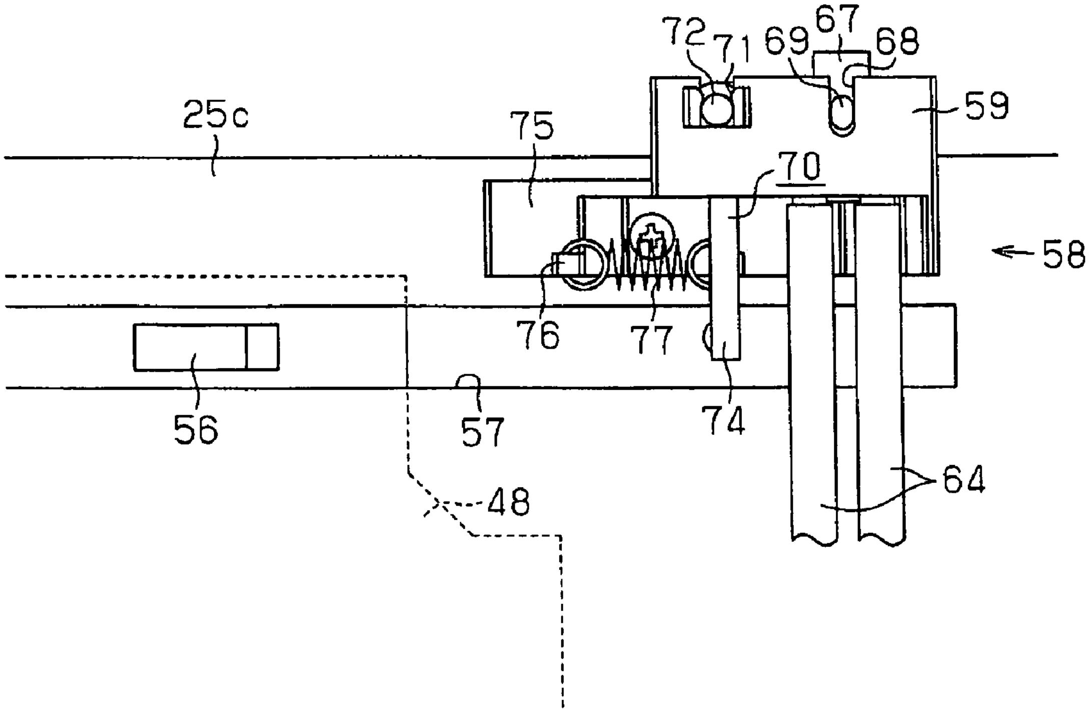
FIG. 12B is a front view corresponding to FIG. 12A.

As shown in FIGS. 12A and 12B, a projection 69 projects from an outer surface of each engagement piece 67 and is engaged with a cutout groove 68, which extends downward from the upper end of the casing portion 59. The projection 69 slides along the cutout groove 68 in the up-and-down direction. This moves the associated valve body 66 between an upper position, or an opening position, and a closing position (a lower position). When located at the opening position, the valve body 66 permits communication between the corresponding ink drainage tube 55, to which the valve body 66 is connected through the air tube 64 and the cap small chamber, and the air. When located at the closing position, the valve body 66 prohibits such communication.

A support groove 71 is defined at the upper end of the casing portion 59 at a position forward from the cutout groove 68 in the casing portion 59. The support groove 71 supports a lever member 70 that moves for selectively opening and closing the valve bodies 66. With reference to FIGS. 13A and 13B, the lever member 70 has an inverse L-shaped cross section. A projection 72 horizontally projects from each of the opposing right and left ends of the bent portion of the lever member 70 and is engaged with the support groove 71. In this manner, the lever member 70 is supported by the casing portion 59 of the air exposure valve device 58 in such a manner as to allow movement of the lever member 70.

A horizontal arm 73 extends backward from the bent portion of the lever member 70 while a suspended arm 74 extends vertically from the bent portion. Specifically, the horizontal arm 73 extends between the valve bodies 66 and the upper ends of the engagement pieces 67 and reaches the position behind the engagement pieces 67. The suspended arm 74 extends through the opening 61 defined in the bottom wall 60 of the casing portion 59 and reaches a lower position, or the position crossing the movement path of the pressing piece 56 of the movable member 41.

As shown in FIGS. 12A, 12B, 13A, and 13B, a seat 75 having a parallelepiped shape is secured to a portion of the right frame member 25_c_ of the body 25 in the vicinity of the front side of the casing portion 59. A hook-like portion 76 projects from a side surface of the seat 75. A coil spring 77 is provided between the hook-like portion 76 and the suspended arm 74 of the lever member 70. Normally, referring to FIG. 13A, the urging force of the coil spring 77 maintains the lever member 70 in a state in which the suspended arm 74 extends vertically with the horizontal arm 73 slightly spaced downward from the engagement pieces 67 of the valve bodies 66 held at the closing positions.

Meanwhile, referring to FIG. 13B, if the pressing piece 56 retreats together with the movable members 41 and presses the suspended arm 74 against the urging force of the coil spring 77, the lever member 70 rotates about the projection 72. In this state, the horizontal arm 73 becomes engaged with the engagement pieces 67 to raise each valve body 66 from the closing position to the opening position. In this manner, the suspended arm 74 of the lever member 70 of the air exposure valve device 58 is selectively pressed by and released from the pressing piece 56 that moves integrally with the movable members 41. This selectively raises and lowers the valve bodies 66 between the lower closing positions and the upper opening positions in association with movement of the movable members 41. In the illustrated embodiment, the pressing piece 56 presses the suspended arm 74 of the lever member 70 of the air exposure valve device 58 when the movable members 41 retreat backward along the rear first threaded sending portions 33, 35 of the lead screws 31, 32.

The movable members 42 for moving the wiping members will be explained later.

As shown in FIGS. 3 to 6, a wiper holder 78 connects the two movable members 42. The wiper holder 78 serves as an associating member through which the movable member 42 associates with the wiper or the wiping member 79. The wiper 79 is secured to an upper surface of the wiper holder 78 and extends along the entire longitudinal direction of the wiper holder 78 and in a slightly diagonal direction. When the lead screws 31, 32 rotate and the movable members 42 and the wiper holder 78 move in the front-and-back direction, the wiper 79 moves in the front-and-back direction in association with movement of the movable members 42 and the wiper holder 78.

The wiper 79 is an all-row wiper and moves in the front-and-back direction with its distal end or upper end slided on the nozzle-forming surface 21_a_ of the recording head 21. In this manner, the wiper 79 wipes the entire nozzle-forming surface 21_a_ throughout the nozzle rows 22A to 22E that are defined on the nozzle-forming surface 21_a_. Therefore, when the movable members 42 are moved along the second threaded sending portions 34, 36 through rotation of the lead screws 31, 32 with the carriage 16 and the recording head 21 maintained at the home position HP, the wiper 79 wipes the entire nozzle-forming surface 21_a_ of the recording head 21.

The movable members 43 for moving a wiping member and a liquid receiving member will hereafter be explained.

Referring to FIGS. 3 to 6, a wiper holder 80 connects the two movable members 43. The wiper holder 80 serves as an associating member through which the movable member 43 associates with a wiping member, or a wiper 81, and a liquid receiving member. The wiper 81 is secured to an upper surface of the wiper holder 80 in the vicinity of the left end of the wiper holder 80 in the longitudinal direction of the wiper holder 80. When the lead screws 31, 32 rotate and the movable members 43 and the wiper holder 80 move in the front-and-back direction, the wiper 81 moves in the front-and-back direction in association with movement of the movable members 43 and the wiper holder 80.

The wiper 81 is a single-row wiper and moves in the front-and-back direction with the distal end or the upper end of the wiper 81 slided on the nozzle-forming surface 21*a* of the recording head 21. In this manner, the wiper 81 exclusively wipes an area including any one of the nozzle rows 22A to 22E defined on the nozzle-forming surface 21*a*, or a portion of the nozzle-forming surface 21*a*. Therefore, before operating the single-row wiper 81, the position of the carriage 16 and the position of the recording head 21 are adjusted at the home position HP in the left-and-right direction in such a manner that one of the nozzle rows, which is a target of wiping, is located in correspondence with the movement path of the wiper 81 in the front-and-back direction. Then, when the movable members 43 are moved along the second threaded sending portions 34, 36 through rotation of the lead screws 31, 32, the wiper 81 wipes the corresponding portion of the nozzle-forming surface 21*a* of the recording head 21.

As shown in FIGS. 5 and 9 to 11, a pair of support pieces 82 project forward from the front wall of the rear casing 25*a* of the body 25. A cutout groove 83 having a hook-like shape extends backward from the top of the distal end of each of the support pieces 82. A rectangular seal plate 84 that has a front seal surface is arranged between the left and right support pieces 82. Shaft portions 85 project horizontally from the opposing left and right sides of the seal plate 84. Each of the shaft portions 85 is engaged with the cutout groove 83 of the corresponding one of the support pieces 82 in such a manner as to allow pivoting of the seal plate 84 about the shaft portions 85 or the pivotal center.

Coil springs 86 are provided between the front surface of the rear casing 25*a* and a rear surface of the seal plate 84 and above the support pieces 82. Normally, the urging force generated by the coil springs 86 urges the seal plate 84 to pivot about the shaft portions 85 or the pivotal center in a clockwise direction of FIGS. 9A to 11B. A projection 87, which serves as a stopper, projects forward from the front surface of the rear casing 25*a* at a position lower than the support pieces 82. A lower portion of the rear surface of the seal plate 84 contacts the projection 87 when the seal plate 84 is urged to pivot by the coil springs 86. This prevents the seal plate 84 from further pivoting.

Figure 14:
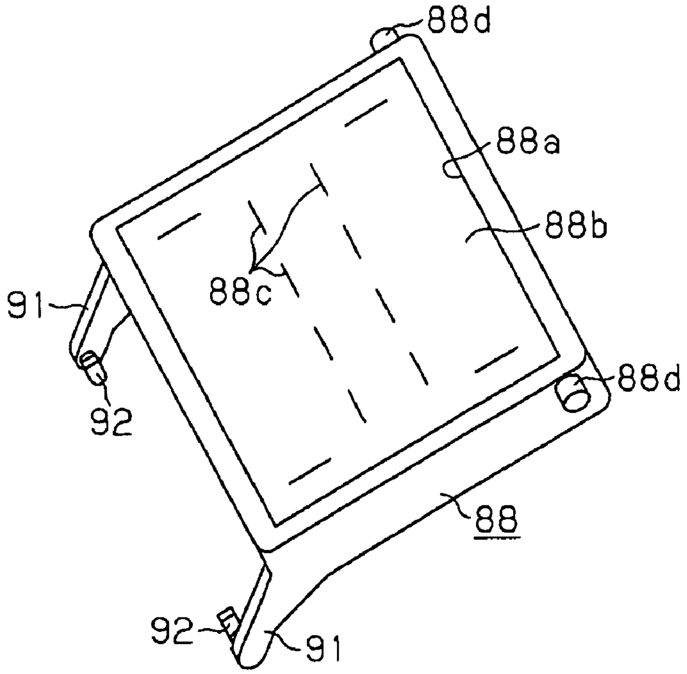
FIG. 14 is a perspective view showing the flushing box.

As shown in FIGS. 3, 5, and 9 to 11, a flushing box 88, which forms the liquid receiving member, is provided between the seal plate 84 and the wiper holder 80. As shown in FIG. 14, the flushing box 88 is a box having a closed bottom and has a rectangular opening 88*a* defined in correspondence with the nozzle-forming surface 21*a* of the recording head 21. A liquid absorbing material 88*b* is received in the flushing box 88 with a wire 88*c* stopping the liquid absorbing material 88*b* from falling from the flushing box 88. The liquid absorbing material 88*b* is formed of the same material as the ink absorbing materials 53 accommodated in the cap small chambers of the aforementioned cap member 51.

With reference to FIGS. 3 and 5, an end of a waste liquid tube 89, which forms a liquid drainage line, is connected to a substantial center of one side of the bottom of the flushing box 88 so that the waste liquid tube 89 communicates with the interior of the flushing box 88. The opposing end of the waste liquid tube 89 is routed into the suction pump 29 and then the waste ink tank (not shown), which is provided in the lower portion of the space in the body casing 11.

Referring to FIG. 14, a pair of pin portions 88*d* project horizontally at an end of the flushing box 88. The pin portions 88*d* are pivotally supported by the two support pieces 90 that project backward from the left and right ends of the aforementioned wiper holder 80. Through such arrangement, the flushing box 88 is supported by the wiper holder 80 pivotally about the pin portions 88*d*.

Figure 9A:
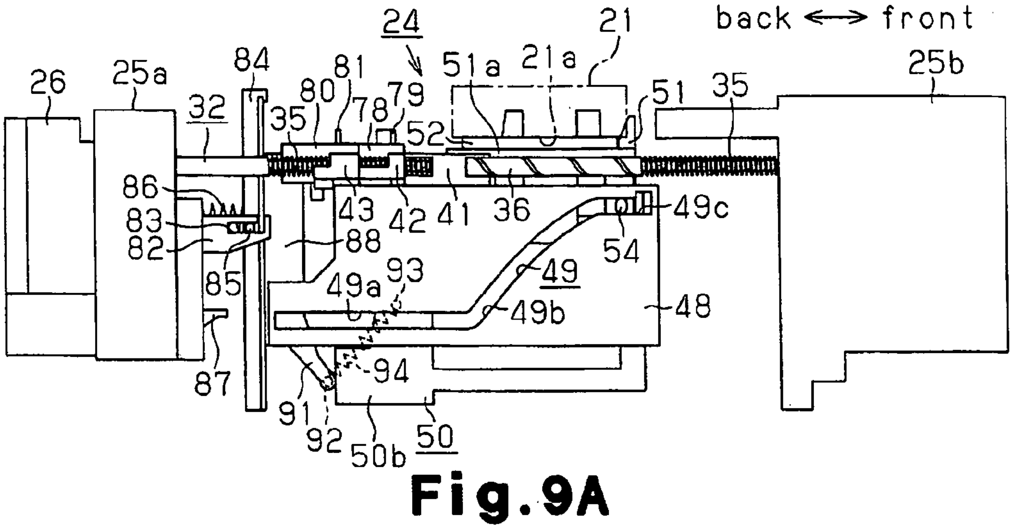
FIG. 9A is a view schematically showing the maintenance unit when a cap member is located at a sealing position.

As illustrated in FIGS. 3, 5, and 9A, when the flushing box 88 is not in operation, or not receiving the ink from the recording head 21, the flushing box 88 is held at a non-receiving position with its opening 88*a* arranged backward and extending substantially vertical. The opening 88*a* is thus blocked by the front surface of the seal plate 84. This prevents dryness and solidification of the ink retained by the liquid absorbing material 88*b* in the flushing box 88.

Referring to FIG. 14, a pair of plate-like leg portions 91 are formed integrally with the opposing end of the flushing box 88. The leg portions 91 project diagonally outward from the bottom surface of the flushing box 88. Pin portions 92 project horizontally from the inner sides of the distal ends of the leg portions 91. The aforementioned holder member 50 has a pair of plate-like support pillar portions 50*a* that project from the left and right sides of the rear end of the holder member 50. The leg portions 91 are arranged in correspondence with base portions 50*b* of the support pillar portions 50*a* in the left-and-right direction. As illustrated in FIG. 9A, when the flushing box 88 is not in operation and held in a substantially vertical state, the leg portions 91 contact the base portions 50*b* from behind.

A pair of pin portions 93 project horizontally from the inner sides of a substantial middle portion of the holder member 50 in the direction defined by the height of the left and right support pillar portions 50*a*. The pin portions 93 are arranged in correspondence with the pin portions 92 of the leg portions 91 of the flushing box 88. A coil spring 94 is arranged between each of the pin portions 92 and the corresponding one of the pin portions 93. Typically, the urging force of the coil springs 94 urges the flushing box 88 to pivot about the pivotal center defined by one end of the flushing box 88, or the pin portions 88*d* formed at the upper end of the flushing box 88, in the direction (a counterclockwise direction of FIGS. 9A to 11B) in which the leg portions 91 are pressed against the base portions 50*b* of the support pillar portions 50*a* of the holder member 50.

Referring to FIGS. 9A to 11B, a width increasing stepped portion 95 is provided in an inner side of each support pillar portion 50*a* of the holder member 50 at a position downward from the upper end of the support pillar portion 50*a* by the distance corresponding to the depth of the flushing box 88. The width increasing stepped portion 95 makes the distance between the left and right support pillar portions 50*a* slightly increased compared to the width of the flushing box 88 in the left-and-right direction. This structure allows the flushing box 88 to pass between the left and right support pillar portions 50*a* of the holder member 50 at a position higher than the width increasing stepped portion 95. The flushing box 88 is thus allowed to move in the front-and-back direction.

Therefore, when the movable members 43 and the wiper holder 80 move in the front-and-back direction through rotation of the lead screws 31, 32, the flushing box 88 moves in the front-and-back direction in association with movement of the movable members 43 and the wiper holder 80. That is, when the lead screws 31, 32 rotate and the movable members 43 move along the second threaded sending portions 34, 36, the flushing box 88 moves between a receiving position (see FIG. 11B) and the non-receiving position (see FIG. 9A). When located at the receiving position, the flushing box 88 faces the nozzle-forming surface 21*a* of the recording head 21. The non-receiving position is spaced from the receiving position.

When moving from the receiving position to the non-receiving position, the bottom surface and the leg portions 91 of the flushing box 88 contact the width increasing stepped portions 95, thus switched from a horizontal position to a vertical position. Contrastingly, when moving from the non-receiving position to the receiving position, the flushing box 88 is switched from the vertical position to the horizontal position.

Next, operation of the printer 10, which is configured as above-described, will be explained. The explanation focuses on, particularly, operation of the maintenance unit 24.

In the maintenance unit 24 of the illustrated embodiment, the plurality of driven members such as the cap member 51, the valve bodies 66 each forming the valve member, the wipers 79, 81 each forming the wiping member, and the flushing box 88 forming the liquid receiving member operate in different operational areas for different operational purposes. In the following, operation for maintenance of each of these driven members will be described in turn.

First, operation of the cap member 51 will be explained.

Figure 9B:
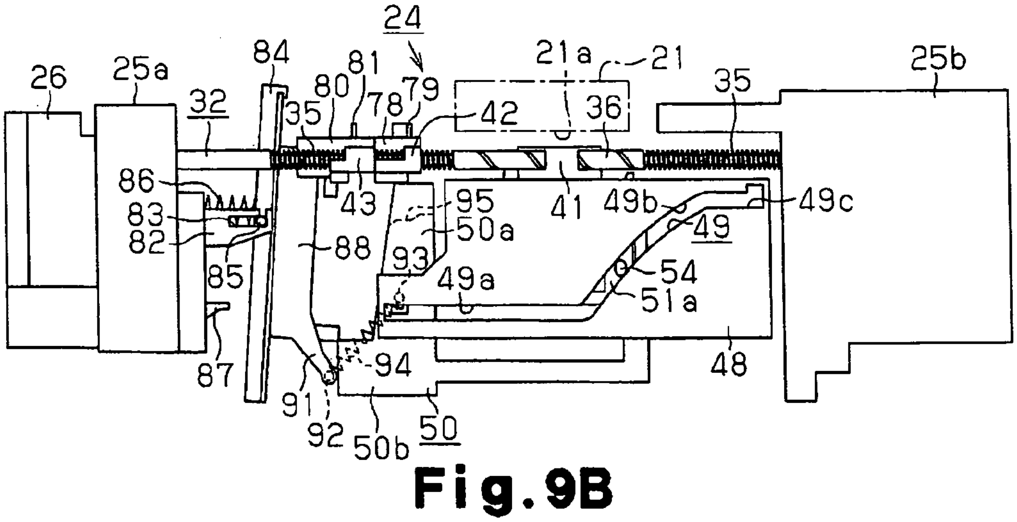
FIG. 9B is a view schematically showing the maintenance unit when the cap member is being raised or lowered.
Figure 9C:
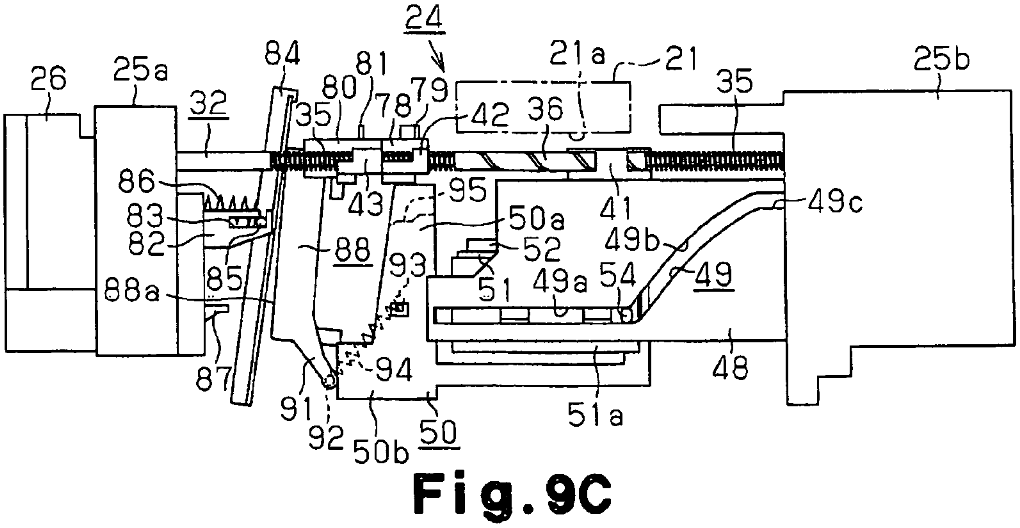
FIG. 9C is a view schematically showing the maintenance unit when the cap member is held at a non-sealing position.

In printing on the paper sheet P by the printer 10, as illustrated in FIG. 9C, the maintenance unit 24 may carry out cleaning, or draw and remove the ink from the nozzle openings 22 of the recording head 21 for the purpose of, for example, prevention of nozzle clogging. In that case, the printer 10 and the maintenance unit 24 operate in the following manners.

In printing, the carriage 16 reciprocates along the guide shaft 15 in a printing area. The carriage 16 is then returned from the position indicated by the double-dotted chain lines of FIG. 5 to the home position HP above the cap member 51 and then stopped. FIG. 5 corresponds to the state of the maintenance unit 24 of FIG. 9A. Afterwards, the drive motor 30 is driven to run in the reverse direction, thus rotating the lead screws 31, 32 in the reverse directions. This causes the movable members 41 to 43 to start retreating.

At this stage, or at the point of time corresponding to the state of FIG. 9C, the movable members 42, 43, the cylindrical portions 44 of which are engaged with the first threaded sending portions 33, 35 of the lead screws 31, 32, retreat relatively slowly. Contrastingly, the movable members 41, the cylindrical portions 44 of which are engaged with the second threaded sending portions 34, 36 of the lead screws 31, 32, retreat relatively quickly. In this state, the plates 48 that are formed integrally with the movable members 41 also retreat relatively rapidly.

Therefore, as illustrated in FIG. 9B, the projections 54 of the cap holder 51*a*, which are engaged with the guide bores 49 of the plates 48, are guided along the diagonal portions 49*b* of the guide bores 49 and thus rise rapidly. As a result, as illustrated in FIG. 9A, the cap member 51 is sent to the uppermost position, or the sealing position. At this position, the cap member 51 seals the nozzle-forming surface 21*a* of the recording head 21 located at the home position HP through sealing performance of the seal portions 52.

The suction pump 29 is then activated by driving the pump motor 28, causing negative pressure in the cap small chambers of the cap member 51 and the ink drainage tubes 55. The ink is thus drawn from the nozzle openings 22 of the recording head 21 and then discharged into the waste ink tank that is arranged downstream from the suction pump 29, in a pressurized state.

As has been described, when the maintenance unit 24 performs cleaning, which is a type of maintenance operation, the lead screws 31, 32 are rotated by the drive force produced by the drive motor 30. The associated ones of the movable members 41, 42 and 43 thus move commonly along the axes S of the corresponding lead screws 31, 32. In this state, the movable members 41 moving along the second threaded sending portions 34, 36 selectively raise and lower the cap member 51, which associates with the movable members 41 through the guide bores 49 and the projections 54, in association with movement of the movable members 41.

In this regard, the cap member 51 is a driven member driven by the movable members 41 and associates with the movable members 41 while allowing transmission of the drive force from the lead screws 31, 32. When sending the cap member 51 from the sealing position (corresponding to the state of FIG. 9A) to the non-sealing position (corresponding to the state of FIG. 9C), the drive motor 30 is driven to run in the forward direction in the state of FIG. 9A. This rotates the lead screws 31, 32 in the forward directions, thus causing the movable members 41 and the plates 48 to proceed. The projections 54 of the cap holder 51*a* are thus guided to move downward by the diagonal portions 49*b* of the guide bores 49. As a result, the cap member 51 is returned to the non-sealing position illustrated in FIG. 9C.

Next, operation of the air exposure valve device 58 including the valve member will be described.

As has been described, to perform cleaning with the nozzle-forming surface 21*a* of the recording head 21 sealed by the cap member 51, the pressure in each cap small chambers of the cap member 51 and the pressure in each ink drainage tube 55 are forcibly lowered to a negative level. It is thus necessary to release the negative pressure from the cap small chambers and the ink drainage tubes 55 after cleaning is completed. For this purpose, the maintenance unit 24 operates in the following manner.

With the cap member 51 maintained at the sealing position (in the state of FIG. 9A) for sealing the nozzle-forming surface 21*a* of the recording head 21, the drive motor 30 is further rotated in the reverse direction, thus further rotating the lead screws 31, 32 in the reverse directions. This causes the movable members 41 to 43 to start further retreating.

When the maintenance unit 24 is held in the state of FIG. 9B, the pressing piece 56 is located at the position of FIG. 12, or at the right side of the maintenance unit 24. As the lead screws 31, 32 are rotated in the reverse directions further from this state, the movable members 41 to 43 are further retreated to the state of FIG. 9A. In this state, the pressing piece 56 is arranged immediately below the seat 75 of the air exposure valve device 58. Therefore, as the lead screws 31, 32 rotate in the reverse directions continuously from this state and the movable members 41 and the plates 48 further retreat, the pressing piece 56 that projects from the associated plate 48 also retreats continuously. Specifically, the plates 48 retreat continuously from the state of FIG. 9A to the state in which the projections 54 of the cap holder 51*a* are located in the vicinity of the front end of the front horizontal portions 49*c* of the guide bores 49. At this point, the pressing piece 56 contacts the suspended arm 74 of the lever member 70 of the air exposure valve device 58.

The lead screws 31, 32 rotate in the reverse directions further from this state and thus the plates 48 retreat continuously. This causes the pressing piece 56 to press the suspended arm 74 against the urging force of the coil spring 77, as illustrated in FIG. 13B, thus pivoting the suspended arm 74 in a counterclockwise direction. The horizontal arm 73 of the lever member 70 thus raises the valve bodies 66 through the engagement pieces 67 in such a manner that each of the valve bodies 66 separates from the valve seat 65 and rises to an air exposure position. This permits communication between the air exposure hole 63 and the air tube 64 and the air, thus releasing the negative pressure from each of the cap small chambers of the cap chamber 51 and each of the ink drainage tubes 55 through the air exposure hole 63 and the air tube 64.

As has been described, when the maintenance unit 24 performs air exposure operation which is a type of maintenance operation, the lead screws 31, 32 are rotated by the drive force produced by the drive motor 30, as in the case of cleaning. The associated ones of the movable members 41, 42 and 43 thus move commonly along the axes S of the corresponding lead screws 31, 32. In this state, the movable members 41, one of which is formed integrally with the plate 48 from which the pressing piece 56 projects, retreat relatively slowly along the front first threaded sending portions 33, 35. In such retreat, the movable members 41 raise the valve bodies 66 of the air exposure valve device 58.

In this regard, in addition to the aforementioned cap member 51, the valve bodies 66 of the air exposure valve device 58 are also driven members driven by the movable members 41 and associate with the movable members 41 while allowing transmission of the drive force from the lead screws 31, 32. To move the valve bodies 66 from the opening positions (corresponding to the state of FIG. 13B) to the closing positions (corresponding to the state of FIG. 13A), the drive motor 30 is driven to run in the forward direction in the state of FIG. 13B. This rotates the lead screws 31, 32 in the forward directions and causes the movable members 41 and the plates 48 to proceed. The pressing piece 56 is then separated from the suspended arm 74 of the lever member 70. As a result, the lever member 70 restores the state of FIG. 13A by the urging force of the coil spring 77. The horizontal arm 73 of the lever member 70 is thus spaced downward from the engagement pieces 67 of the valve bodies 66, returning the valve bodies 66 to the closing positions at which the valve bodies 66 are seated on the valve seats 65.

Third, operation of the wipers 79, 81, each of which forms the wiping member, will hereafter be explained.

In printing, the ink may adhere to the nozzle-forming surface 21*a* undesirably by, for example, being splashed back by the paper sheet P after drops of the ink have been ejected from the nozzle openings 22 onto the paper sheet P. Such adhesion of the ink may influence the direction in which the ink is ejected, leading to a printing problem. Thus, the ink must be wiped off or removed from the nozzle-forming surface 21*a*. For this purpose, the maintenance unit 24 operates in the following manner.

Specifically, with the maintenance unit 24 held in the state of FIG. 9C, the carriage 16 is moved from the position indicated by the double-dotted chain lines of FIG. 5 to the home position HP above the cap member 51 and then stopped. Subsequently, the drive motor 30 is driven to run in the forward direction, thus rotating the lead screws 31, 32 in the forward directions. This causes the movable members 41 to 43 to start proceeding.

At this stage, or at the point of time corresponding to the state of FIG. 9C, the movable members 41, the cylindrical portions 44 of which are engaged with the second threaded sending portions 34, 36 of the lead screws 31, 32, reach the front first threaded sending portions 33, 35 through continuous rotation of the lead screws 31, 32 in the forward directions and proceed along the first threaded sending portions 33, 35 relatively slowly. Meanwhile, the cylindrical portions 44 of the movable members 42, 43 are engaged with the rear first threaded sending portions 33, 35 of the lead screws 31, 32. The movable members 42, which are located forward from the movable members 43, reach the second threaded sending portions 34, 36 through continuous rotation of the lead screws 31, 32 in the forward directions and proceed along the second threaded sending portions 34, 35 relatively rapidly. In this state, the wiper holder 78, which connects the two movable members 42, also proceeds relatively rapidly.

Figure 10:
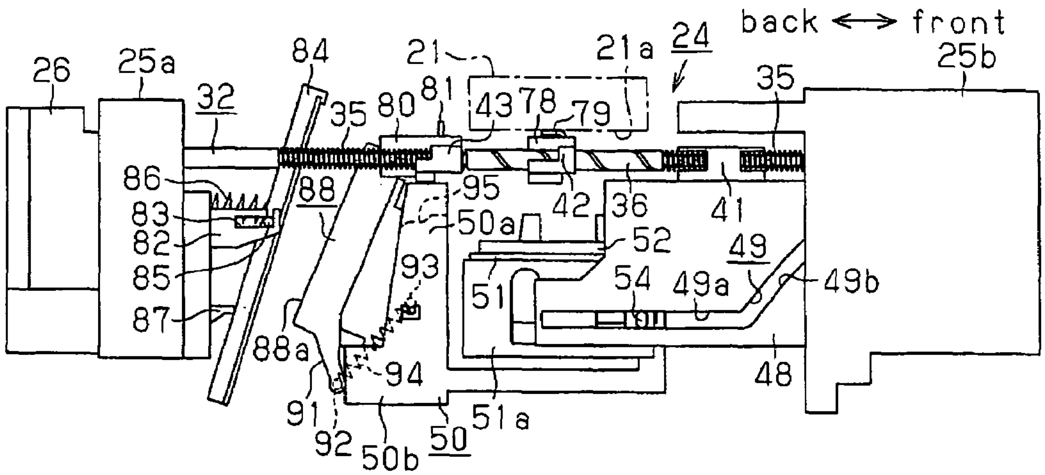
FIG. 10 is a view schematically showing the maintenance unit when an all-row wiper is located at a wiping position.

This advances the wiper 79, which is mounted on the upper surface of the wiper holder 78, from the non-wiping position of FIG. 9C to the wiping position of FIG. 10, together with the wiper holder 78. In proceeding, the wiper 79 slidably contacts the nozzle-forming surface 21*a* of the recording head 21 held at the home position HP while elastically deforming its distal end or the upper end. Through such slidable contact with the nozzle-forming surface 21*a*, the wiper 79 wipes off and removed the adhered ink from the nozzle-forming surface 21*a* throughout the entire nozzle-forming surface 21*a*.

As has been described, when the maintenance unit 24 performs wiping which is a type of maintenance operation, the lead screws 31, 32 are rotated by the drive force produced by the drive motor 30, as in the cases of cleaning and air exposure. The associated ones of the movable members 41, 42 and 43 thus move commonly along the axes S of the corresponding lead screws 31, 32. In this state, the movable members 42 moving along the second threaded sending portions 34, 36 selectively advance or retract the wiper 79, which associates with the movable members 42 through the wiper holder 78, in association of the movable members 42.

In this regard, the wiper 79 is a driven member driven by the movable members 42 and associates with the movable members 42 while allowing transmission of the drive force from the lead screws 31, 32. After the wiper 79 has been sent from the non-wiping position (corresponding to the state of FIG. 9C) to the wiping position (corresponding to the state of FIG. 10), the nozzle-forming surface 21*a* is wiped. After such wiping, the drive motor 30 is rotated in the reverse direction to return the wiper 79 to the original position, or the non-wiping position. This causes reverse rotation of the lead screws 31, 32 and thus retreating of the movable members 42 and the wiper holder 78. As a result, the wiper 79 is returned to the original position, or the non-wiping position illustrated in FIG. 9C, together with the movable members 42 and the wiper holder 78.

Depending on, for example, the frequency of ink ejection, the zones defining the nozzle rows may be cleaned one by one instead of wiping off the adhered ink from the entire nozzle-forming surface 21*a*. In this case, the single-row wiper 81, which associates with the movable members 43 through the wiper holder 80, is operated instead of the all-row wiper 79.

Specifically, the lead screws 31, 32 are caused to rotate in the forward directions before the carriage 16 is sent to the home position HP. Further, the all-row wiper 79 is moved from the position of FIG. 9C to the position of FIG. 11A via the position of FIG. 10.

At this stage, the carriage 16 is returned to and stopped at the home position HP. At this stage, the position of the carriage 16 is adjusted in such a manner that one of the nozzle row defining zones, which is the target of wiping, is located in correspondence with the movement path of the wiper 81 in the front-and-back direction. Afterwards, the lead screws 31, 32 are rotated again in the forward directions. This causes the movable members 43 and the wiper holder 80 to retreat from the positions of FIG. 11 passing below the nozzle-forming surface 21*a* of the recording head 21 held at the home position HP. In this manner, the single-row wiper 81 wipes solely a portion of the nozzle-forming surface 21*a*.

As has been described, when the maintenance unit 24 performs wiping, which is a type of maintenance operation, the all-row wiper 79 and the single-row wiper 81 are selectively operated depending on whether the wiping should be carried out on the entire portion or a restricted portion of the nozzle-forming surface 21*a*. In either case, the lead screws 31, 32 are actuated by the drive force of the drive motor 30, as in the cases of the cleaning and the air exposure operation. Specifically, the associated ones of the movable members 41, 42 and 43 move along the axes S of the corresponding lead screws 31, 32. To wipe the restricted portion of the nozzle-forming surface 21*a*, the movable members 43 moving along the second threaded sending portions 34, 36 selectively advance and retract the wiper 81, which associates with the movable members 43 through the wiper holder 80, in association with movement of the movable members 43.

In this regard, the wiper 81 is a driven member driven by the movable members 43 and associates with the movable members 43 while allowing transmission of the drive force from the lead screws 31, 32. After the wiper 81 has been sent from the non-wiping position to the wiping position, the nozzle-forming surface 21*a* is cleaned. After such wiping, the drive motor 30 is rotated in the reverse direction to return the wiper 81 to the original position, or the non-wiping position. This causes reverse rotation of the lead screws 31, 32 and thus retreating of the movable members 43 and the wiper holder 80. As a result, the wiper 81 is returned to the original position, or the non-sealing position illustrated in FIG. 9C, together with the movable members 43 and the wiper holder 80.

Finally, operation of the flushing box 88, which forms the liquid receiving member, will be described as follows.

When the printer 10 is printing on the paper sheet P in the state of FIG. 9C, there may be cases in which flushing by the maintenance unit 24 is carried out. In the flushing, piezoelectric elements (not shown), which are arranged in the recording head 21 in correspondence with the nozzle openings 22, are excited in response to a control signal unrelated to printing, in such a manner as to cause ink ejection from the nozzle openings 22. In that case, the printer 10 and the maintenance unit 24 operate in the following manners.

Specifically, the lead screws 31, 32 are rotated in the forward directions before moving the carriage 16 to the home position HP. Further, the wiper 79, together with the movable members 42, are sent from the position of FIG. 9C to the position of FIG. 10 and then to the position of FIG. 11A. The operation so far is the same with that of the above-described wiping operation with the single-row wiper 81. However, to perform the flushing, the drive motor 30 is driven to rotate in the forward direction at this point of time, without moving the carriage 16 to the home position HP. The lead screws 31, 32 are rotated in the forward directions correspondingly.

Figure 11A:
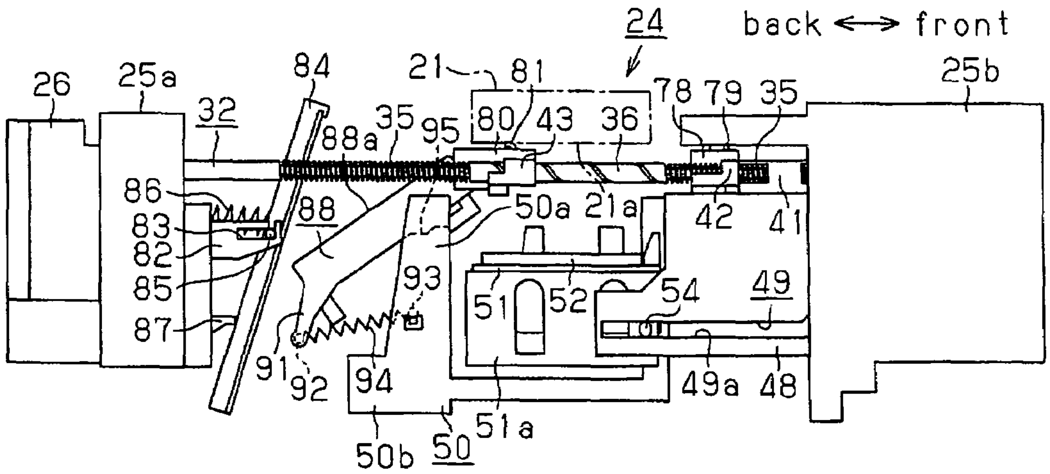
FIG. 11A is a view schematically showing a main portion of the maintenance unit when a single-row wiper is located at a wiping position.
Figure 11B:
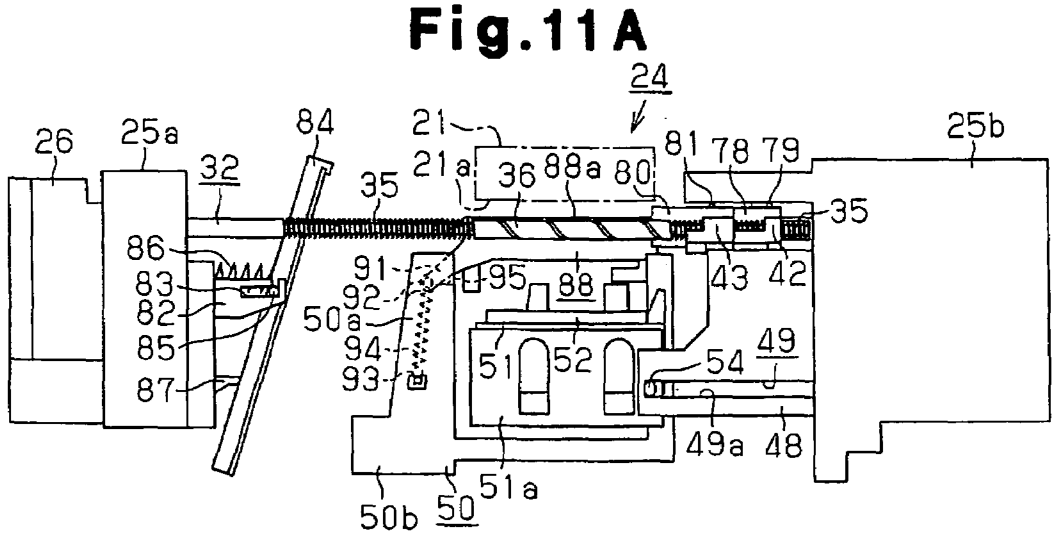
FIG. 11B is a view schematically showing a flushing box located at a liquid receiving position.

Then, through continuous rotation of the lead screws 31, 32 in the forward directions, the movable members 43 and the wiper holder 80 proceed from the state of FIG. 11A, passing below the home position HP. The movable members 43 then reach the front first threaded sending portions 33, 35, as illustrated in FIG. 11B. In this case, the single-row wiper 81, which is secured to the upper surface of the wiper holder 80, also proceeds passing below the home position HP, integrally with the movable members 43. However, since the carriage 16 is not yet deployed at the home position HP at this stage, unnecessary wiping of the nozzle-forming surface 21*a* does not occur.

While switching from the state of FIG. 9C to the state of FIG. 11B, the position of the flushing box 88 changes in the following manner. Before the movable members 43 start proceeding, the flushing box 88 is held in a substantially vertical state, as illustrated in FIG. 9C. As the lead screws 31, 32 rotate in the forward directions, the movable members 43 gradually advance along the rear first threaded sending portions 33, 35. In such advancing of the movable members 43, the flushing box 88 pivots about the pin portions 88*d*, which are located at one end, or the upper end, of the flushing box 88, in a clockwise direction of FIGS. 9A to 10. In other words, the flushing box 88 changes its position while moving in the front-and-back direction that is perpendicular to the reciprocating direction of the carriage 16, or the left-and-right direction.

More specifically, at a first stage, the legs 91 are held in contact with the base portions 50*b* of the support pillar portions 50*a* of the holder member 50 by the urging force of the coil spring 94. However, as the movable members 43 continuously proceed from the positions of FIG. 10, the bottom surface of the flushing box 88 is mounted on the width increasing stepped portions 95 of the support pillar portions 50*a*. Then the lead screws 31, 32 are further rotated in a forward direction in such a manner that the movable members 43 reach the second threaded sending portions 34, 36, as illustrated in FIG. 11B.

From this point of time, the movable members 43 advances at increased speed to the front first threaded sending portions 33, 35. In this state, the flushing box 88 is deployed at the receiving position that is immediately below the home position HP while maintaining a horizontal position with the leg portions 91 supported by the width increasing stepped portion 95 of the support pillar portions 50*a*. At this stage, the carriage 16 is sent to and stopped at the home position HP that is immediately above the flushing box 88. The opening 88*a* of the flushing box 88 thus becomes opposed and close to the nozzle-forming surface 21*a* of the recording head 21. Then, the ink is ejected from the nozzle openings 22 of the recording head 21 for the flushing. The ink is thus absorbed and retained by the liquid absorbing material 88*b* in the flushing box 88.

As has been described, when the maintenance unit 24 performs flushing, which is a type of maintenance operation, by the maintenance unit 24, the lead screws 31, 32 are actuated by the drive force of the drive motor 30, as in the cases of the cleaning, the air exposure, and the wiping. The associated ones of the movable members 41, 42 and 43 thus move along the axes S of the corresponding lead screws 31, 32. The movable members 43 advance or retract the flushing box 88 or change the position of the flushing box 88, which associates with the movable members 43 through the wiper holder 80, in association with movement of the movable members 43.

In this regard, in addition to the above-described wiper 81, the flushing box 88 is a driven member driven by the movable members 43 and associates with the movable members 43 while allowing transmission of the drive force from the lead screws 31, 32. To return the flushing box 88 from the receiving position (corresponding to the state of FIG. 11B) to the non-receiving position (corresponding to the state of FIGS. 9A to 9C) after the flushing, the drive motor 30 is rotated in the reverse direction in the state of FIG. 11B. This causes reverse rotation of the lead screws 31, 32 and thus retreat of the movable members 43 and the wiper holder 80. The urging force of the coil springs 94 thus urge the flushing box 88 to pivot in the direction in which the leg portions 91 are brought into contact with the base portions 50*b* of the support pillar portions 50*a*. As a result, the flushing box 88 is returned to the non-receiving position as illustrated in FIG. 9C.

Before the printer 10 is turned off, the lead screws 31, 32 are further rotated in the reverse directions in such a manner that the movable members 43 retreat to the positions of FIG. 9A. This causes the flushing box 88 to pivot about the pin portions 88*d* and restore a vertical position. The opening 88*a* of the flushing box 88 is thus blocked by the seal plate 84. In this state, the coil springs 86 urge the seal plate 84 toward the flushing box 88, ensuring sealing performance of the opening 88*a* of the flushing box 88.

Figure 15:
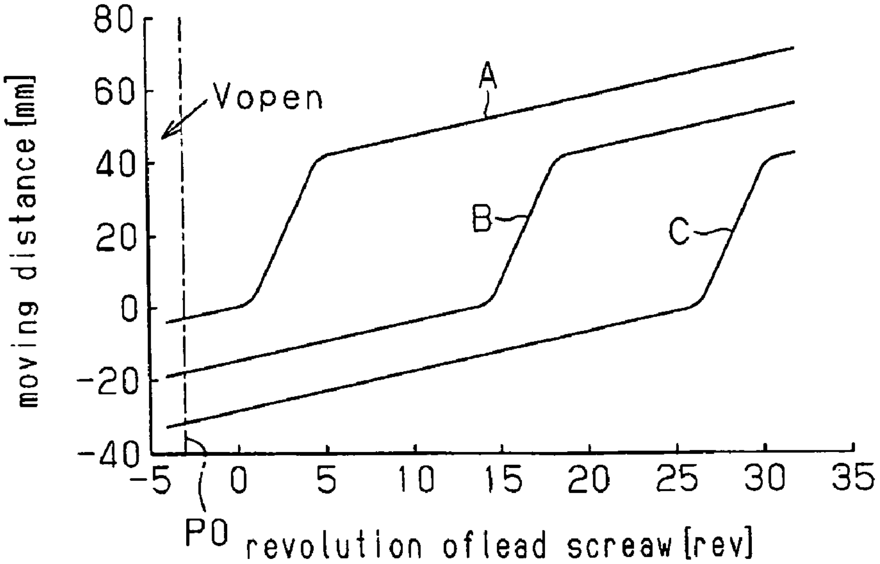
FIG. 15 is a graph representing the relationship between the rotation amount of the lead screw and the movement distances of the movable members.

FIG. 15 is a graph representing variation of the movement distance of the movable members 41 to 43 in correspondence with the rotational amount (rev) of the lead screws 31, 32. In the graph, the solid line A represents the movement distance of each movable member 41. The solid line B represents the movement distance of each movable member 42. The solid line C represents the movement distance of each movable member 43. As is understood from FIG. 15, although the associated ones of the movable members 41, 42 and 43 are mounted on the same lead screws 31, 32 and move along the direction of the axes S of the lead screws 31, 32, the movable members 41 to 43 are moved to different positions in the direction of the axes S of the lead screws 31, 32 in correspondence with the rotation amount of the lead screws 31, 32.

The solid lines A, B, C representing the movement distances of the movable members 41 to 43 each exhibit a steep rise, indicating that the corresponding movable members 41 to 43 moving along the second threaded sending portion 34, 36 of the lead screws 31, 32. In the graph, the rotation amount of the lead screws 31, 32 indicated by the single-dotted chain line $P_0$ corresponds to the base position of the lead screws 31, 32. A controller, or a CPU (not shown), controls the operational state of the drive motor 30 with reference to the rotation amount (the rotational angle) indicated by the single-dotted chain line $P_0$. If the rotation amount of the lead screws 31, 32 falls in the range $V_{open}$, which is illustrated at the left side of the single-dotted chain line $P_0$ of FIG. 15, it is indicated that the cap member 51 is located at the sealing position at which the cap member 51 seals the nozzle-forming surface 21*a* of the recording head 21. Meanwhile, the pressing piece 56 of the movable member 41 presses the lever member 70 of the air exposure valve device 58 so as to raise the valve bodies 66 to the opening positions.

The illustrated embodiment has the following advantages.

The movable members 41 to 43 associate with the plurality of driven members of the maintenance unit 24, which are the cap member 51, the valve bodies 66, the wipers 79, 81, the flushing box 88. The drive force produced by each lead screw 31, 32 is thus transmissible commonly to the driven members when the movable members 41, 42 and 43 move. This decreases the size of the drive force transmission structure including the lead screws 31, 32 and the movable members 41, 42 and 43 and simplifies the structure. Further, the drive force is reliably transmitted to the plurality of driven members of the printer 10 that operate in different operational areas for different operational purposes.

The movable members 41 are provided with the associating portion through which the movable members 41 associate with the cap member 51, which is the guide bore 49, and the associating portion through which the movable members 41 associate with the valve bodies 66 of the air exposure valve device 58, or the pressing piece 56. The movable members 42 are provided with the associating portion through which the movable members 42 associate with the wiper 79, which is the wiper holder 78. The movable members 43 are provided with the wiper holder 80, which serves both as the associating portion through which the movable members 43 associate with the wiper 81 and the associating portion through which the movable members 43 associate with the flushing box 88. This configuration allows the movable members 41, 42 and 43 to operate the driven members with which the movable members 41 to 43 associate through the corresponding associating portions separately from the other driven members, when moving on the rotating lead screws 31, 32.

The lead screws 31, 32, which form drive force transmitting members and sending members, are elongated bar-like members. The space for accommodating the lead screws 31, 32 in the body casing 11 and the maintenance unit 24 of the printer 10 is thus easily ensured. This reduces the size of the printer 10 correspondingly.

Even though the lead screws 31, 32 are rotated at a constant speed, the movement speed of each of the movable members 41, 42 and 43 is varied between the state in which each movable member 41, 42 and 43 moves while engaged with the corresponding first threaded sending portions 33, 35 and the state in which each movable members 41, 42 and 43 is operated while engaged with the second threaded sending portions 34, 36. In other words, each movable member 41, 42 and 43 moves rapidly when engaged with the second threaded sending portions 34, 36 compared to when engaged with the first threaded sending portions 33, 35. Thus, when each movable member 41, 42 and 43 moves while engaged with the second threaded sending portions 34, 36, the driven members provided specifically in correspondence with movable members 41, 42 and 43, which are the cap members 51, the valve bodies 66, the wipers 79, 81, and the flushing box 88, are operated quickly.

As the movable members 41, 42 and 43 sequentially move along the direction of the axes S of the corresponding lead screws 31, 32, the driven members, or the cap member 51, the valve bodies 66, the wipers 79, 81, and the flushing box 88, start to operate sequentially in the direction of the axes S in the order of movement of the movable members 41, 42 and 43. By adjusting the rotation amount of each lead screw 31, 32, at least one pair of the movable members 41, 42 and 43 are selectively moved along the second threaded sending portions 34, 36. This allows operation of the desired one(s) of the driven members of the printer 10 or the maintenance unit 24.

The lead screws 31, 32, which form the drive force transmitting members and the sending members, are not custom products but general products. Accordingly, by employing the lead screws 31, 32, size reduction and simplification of the drive force transmission structure of the printer 10 or the maintenance unit 24 are facilitated.

The illustrated embodiment may be modified to the following embodiments.

Regarding a plurality of the driven members or the cap member 51, the valve bodies 66, the wipers 79, 81, and the flushing box 88, it is sufficient if the maintenance unit 24 includes at least two of the driven members.

The drive force transmitting members, which are formed by the lead screws 31, 32, may be slidable members or shafts that slide along the direction of the axes S. In this case, at least one movable member is secured to each of the shafts at a predetermined interval in the longitudinal direction of the shaft. It is preferred that a plurality of driven members are operated when the movable members are moved through movement of the shafts and allowed to associate with the driven members.

The threaded groove 47 of the lead screw 31 and that of the lead screw 32 may be spiral grooves with the same pitch.

Each movable member may include a nut member in which a female threaded bore to engage with the corresponding lead screws 31, 32 is provided. In this case, the female threaded bore is an engagement portion.

A movable member other than the movable members 41, 42 and 43 may be secured to each of the lead screws 31, 32 at a position backward from the movable member 43 in the direction of the axes S of the lead screws 31, 32. The pressing piece 56 that is provided in that movable member presses and pivots the lever member 70 of the air exposure valve device 58 when the movable member retreats. In this manner, the valve bodies 66 are switched between the opening positions and the closing positions. In other words, movable members may be secured to each lead screw 31, 32 by the quantity corresponding to the quantity of the driven members along the direction of the axes S. Each of the movable members may be provided with one associating portion in correspondence with one of the driven members.

A wiper other than the single-row wiper 81 may be provided in the wiper holder 80.

The pressing piece 56 may be provided in the corresponding movable member 42 or the corresponding movable member 43, instead of the plate 48 of the corresponding movable member 41. Specifically, the pressing piece 56 may be formed in the wiper holder 78 associated with the movable member 42 or the wiper holder 80 associated with the movable member 43.

Only one of the movable members 41, 42 and 43 may be employed. That is, the plate 48 in which the guide bore 49 is provided may be formed integrally with one movable member. Further, the wiper holder 78 in which the wiper 79 is arranged is connected to the movable member and the flushing box 88 is supported by the wiper holder 78 through a shaft. Also, the pressing piece 56 is formed integrally with the wiper holder 78. This structure allows the single movable member to operate each of the four types of driven members, or the cap member 51, the valve bodies 66, the wiper 79, and the flushing box 88, when the movable member moves. In other words, one or more associating portions may be provided in correspondence with one movable member in such a manner that the movable member associates with three or more driven members. The driven members are thus operated in association with the movable member in movement.

The printer 10 may be an off-carriage type inkjet printer, other than the on-carriage type inkjet printer in which the ink cartridge 23 is mounted in the carriage 16.

The liquid ejection apparatus may be any suitable type other than the printer 10 that ejects ink. For example, the liquid ejection apparatus may be a printing device including a fax or a copier; a liquid ejection apparatus that ejects liquid such as electrode material or color material used in the manufacture of liquid crystal displays, EL displays, and surface emitting displays; a liquid ejection apparatus that ejects bioorganic matter used in the manufacture of biochips; or a liquid ejection apparatus as a precision pipette. Further, liquid other than the ink may be ejected by the liquid ejection apparatus.

The present invention is not restricted to application to the liquid ejection apparatus. The invention may be embodied to a mechanical device (e.g. a machine tool) that cause a plurality of driven members to operate in different operational areas for different operational purposes using the drive force transmission device including the lead screws and the movable members.

The present examples and embodiments are to be considered as illustrative and not restrictive and the invention is not to be limited to the details given herein, but may be modified within the scope and equivalence of the appended claims.

What is claimed is:

1. A drive force transmission device that causes a plurality of driven members to operate in different operational areas for different operational purposes, comprising:

a lead screw having a threaded portion formed on an outer circumferential surface of the lead screw, the lead screw being rotated about an axis of the lead screw when a drive force is generated, wherein the plurality of driven members does not engage the threaded portion; and at least one movable member having an engagement portion that is arranged to engage with the threaded portion of the lead screw, the movable member being moved along an axial direction of the lead screw through the engagement portion guided by the threaded portion when the lead screw rotates, wherein, while moving, the movable member operates each of the plurality of driven members by the drive force.

2. The device according to claim 1, wherein the at least one movable member is provided with an associating portion in correspondence with at least one of the driven members, and wherein, while moving, the movable member operates the at least one of the driven members maintained in a state associated with the movable member through the associating portion.

3. The device according to claim 1, wherein:

the threaded portion has a first threaded portion and a second threaded portion that are continuous with each other, the at least one movable member includes a plurality of movable members, the plurality of movable members engages the first and second threaded portions, and the pitch of the first threaded portion is smaller that the pitch of the second threaded portion.

4. The device according to claim 1, wherein the at least one movable member includes a plurality of movable members that move sequentially along the axial direction of the lead screw when the lead screw rotates, and wherein the driven members are aligned in the axial direction of the lead screw in the order in which the driven members start to operate in a state associated with the driven members when the movable members move.

5. A mechanical device comprising:

a plurality of driven members that operates in different operational areas for different operational purposes;

a lead screw having a threaded portion formed on an outer circumferential surface of the lead screw, the lead screw being rotated about an axis of the lead screw when a drive force is generated, wherein the plurality of driven members does not engage the threaded portion; and at least one movable member having an engagement portion that is arranged to engage with the threaded portion of the lead screw, the movable member being moved along an axial direction of the lead screw through the engagement portion guided by the threaded portion when the lead screw rotates, wherein, while moving, the movable member operates each of the plurality of driven members by the drive force.

6. The mechanical device according to claim 5, wherein the at least one movable member is provided with an associating portion in correspondence with at least one of the driven members, and wherein, while moving, the movable member operates the at least one of the driven member maintained in a state associated with the movable member through the associating portion.

7. The mechanical device according to claim 5, wherein:

the threaded portion has a first threaded portion and a second threaded portion that are continuous with each other, the at least one movable member includes a plurality of movable members, the plurality of movable members engages the first and second threaded portions, and the pitch of the first threaded portion is smaller that the pitch of the second threaded portion.

8. The mechanical device according to claim 5, wherein the at least one movable member includes a plurality of movable members that move sequentially along the axial direction of the lead screw when the lead screw rotates, and wherein the driven members are aligned in the axial direction of the lead screw in the order in which the driven members start to operate in a state associated with the corresponding movable members when the movable members move.

9. A liquid ejection apparatus comprising:

a plurality of driven members including at least two members selected from;

a cap member movable between a sealing position at which the cap member is allowed to seal a nozzle-forming surface of a liquid ejection head and a non-sealing position spaced from the nozzle-forming surface;

a wiping member movable between a wiping position at which the wiping member is allowed to wipe off an adhered liquid from the nozzle-forming surface of the liquid ejection head and a non-wiping position spaced from the wiping position;

a valve member movable between an opening position at which the interior of a liquid passage in which the liquid flows in a pressurized state is exposed to the air and a closing position at which the interior of the liquid passage is blocked from the air; and a liquid receiving member movable between a receiving position at which the liquid receiving member is opposed to the nozzle-forming surface in such a manner as to receive the liquid ejected from the liquid ejection head when printing is not performed and a non-receiving position spaced from the receiving position;

a drive force transmitting member that operates at a certain position when a drive force is generated; and at least one movable member that moves in a predetermined direction when the drive force transmitting member operates, wherein, while moving, the movable member operates each of the plurality of driven members by the drive force.

10. The apparatus according to claim 9, wherein the movable member is provided with an associating portion in correspondence with the at least one of the driven members, and wherein, while moving, the movable member operates each of the driven members maintained in a state associated with the movable member through the associating portion.

11. The apparatus according to claim 9, wherein the drive force transmission member comprises an elongated bar-like sending member, wherein the sending member is rotated about its axis by the drive force, wherein the movable member has an engagement portion that is arranged to engage with the threaded portion of the sending member, and wherein the movable member is moved along the longitudinal direction of the sending member through the engagement portion guided by the threaded portion when the sending member rotates.

12. The apparatus according to claim 11, wherein:

the threaded portion has a first threaded portion and a second threaded portion that are continuous with each other, the at least one movable member includes a plurality of movable members, the plurality of movable members engages the first and second threaded portions, and the pitch of the first threaded portion is smaller that the pitch of the second threaded portion.

13. The apparatus according to claim 11, wherein the at least one movable member includes a plurality of movable members that move sequentially along the axial direction of the lead screw when the lead screw rotates, and wherein the driven members are aligned in the axial direction of the lead screw in the order in which the driven members start to operate in a state associated with the corresponding movable members when the movable members move.

14. The apparatus according to claims 11, wherein the sending member includes a lead screw.

* * * * *